(12) United States Patent
Osindero et al.

(10) Patent No.: US 10,867,221 B2
(45) Date of Patent: Dec. 15, 2020

(54) COMPUTERIZED METHOD AND SYSTEM FOR AUTOMATED DETERMINATION OF HIGH QUALITY DIGITAL CONTENT

(71) Applicant: VERIZON MEDIA INC., New York, NY (US)

(72) Inventors: Simon Kayode Osindero, San Francisco, CA (US); Frank Liu, San Francisco, CA (US); Gerry Pesavento, San Francisco, CA (US); Miriam Redi, Barcelona (ES); Lucca Maria Aiello, Barcelona (ES); Anastasia Alexeevna Svetlichnaya, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 113 days.

(21) Appl. No.: 15/599,525

(22) Filed: May 19, 2017

(65) Prior Publication Data
US 2017/0255845 A1    Sep. 7, 2017

Related U.S. Application Data

(62) Division of application No. 14/816,516, filed on Aug. 3, 2015, now Pat. No. 9,672,445.

(51) Int. Cl.
*G06K 9/00* (2006.01)
*G06K 9/82* (2006.01)
*G06K 9/78* (2006.01)
*G06K 9/62* (2006.01)
*G06F 16/50* (2019.01)
(Continued)

(52) U.S. Cl.
CPC ............ *G06K 9/82* (2013.01); *G06F 16/50* (2019.01); *G06F 16/5866* (2019.01);
(Continued)

(58) Field of Classification Search
CPC ...... G06K 9/82; G06K 9/6267; G06K 9/6215; G06K 9/6202; G06K 9/66; G06K 9/481;
(Continued)

(56) References Cited

U.S. PATENT DOCUMENTS 8,724,910 B1    5/2014 Pillai et al.
8,731,301 B1 *  5/2014 Bushman ............. G06K 9/2063
                                                      235/375
(Continued)

*Primary Examiner* — Aaron W Carter
(74) *Attorney, Agent, or Firm* — James J. DeCarlo; Greenberg Traurig, LLP

(57) ABSTRACT

Disclosed are systems and methods for improving interactions with and between computers in a content generating, hosting and/or providing system supported by or configured with personal computing devices, servers and/or platforms. The systems interact to identify and retrieve data across platforms, which can be used to improve the quality of data used in processing interactions between or among processors in such systems. The disclosed systems and methods provide systems and methods for automatic discovery of high quality digital content. According to embodiments, the present disclosure describes improved computer system and methods directed to analyzing raw image data, such as features and descriptors of images in order to identify a high quality image(s). Such images can be identified from a database of images, and such images can be identified in real-time, or near real-time during the capture of an image(s) by a camera.

19 Claims, 11 Drawing Sheets

(51) Int. Cl.
*G06F 16/58* (2019.01)
*G06K 9/03* (2006.01)
*H04N 5/232* (2006.01)
*H04N 21/482* (2011.01)
*G06K 9/48* (2006.01)
*G06K 9/66* (2006.01)

(52) U.S. Cl.
CPC ............ *G06K 9/036* (2013.01); *G06K 9/481* (2013.01); *G06K 9/6202* (2013.01); *G06K 9/6215* (2013.01); *G06K 9/6254* (2013.01); *G06K 9/6267* (2013.01); *G06K 9/66* (2013.01); *G06K 9/78* (2013.01); *H04N 5/23222* (2013.01); *H04N 21/4828* (2013.01)

(58) Field of Classification Search
CPC ........ G06K 9/036; G06K 9/78; G06K 9/6254; G06F 16/5866; G06F 16/50; H04N 21/4828; H04N 5/23222
See application file for complete search history.

(56) References Cited

U.S. PATENT DOCUMENTS

| | | | |
|---|---|---|---|
| 9,087,273 B2 | 7/2015 | Garcia et al. | |
| 9,672,445 B2 * | 6/2017 | Osindero | G06K 9/82 |
| 10,055,646 B2 * | 8/2018 | Bataller | G06T 7/80 |
| 2004/0161224 A1 | 8/2004 | Yamazoe et al. | |
| 2012/0128239 A1 * | 5/2012 | Goswami | G06T 7/0002 382/162 |
| 2012/0155765 A1 | 6/2012 | Joshi et al. | |
| 2012/0221563 A1 | 8/2012 | De et al. | |
| 2013/0142402 A1 * | 6/2013 | Myers | G06K 9/00288 382/118 |
| 2013/0148864 A1 | 6/2013 | Dolson et al. | |
| 2013/0194438 A1 | 8/2013 | Sweet, III et al. | |
| 2014/0126790 A1 * | 5/2014 | Duchesne | G06T 7/0002 382/128 |
| 2014/0164365 A1 | 6/2014 | Graham | |
| 2014/0169672 A1 * | 6/2014 | Zhu | G06K 9/6212 382/170 |
| 2014/0278997 A1 * | 9/2014 | Kishi | G06Q 30/0258 705/14.56 |
| 2015/0310132 A1 | 10/2015 | Derstadt | |
| 2015/0332123 A1 * | 11/2015 | Reibman | G06K 9/6215 382/190 |
| 2015/0370830 A1 | 12/2015 | Murphy-Chutorian et al. | |
| 2016/0058426 A1 * | 3/2016 | Hedlund | A61B 6/487 600/410 |
| 2017/0039452 A1 * | 2/2017 | Osindero | G06K 9/82 |
| 2017/0132457 A1 * | 5/2017 | Zhu | G06K 9/00281 |
| 2017/0255845 A1 * | 9/2017 | Osindero | G06K 9/82 |
| 2018/0075637 A1 * | 3/2018 | Henry | G06T 11/60 |

* cited by examiner

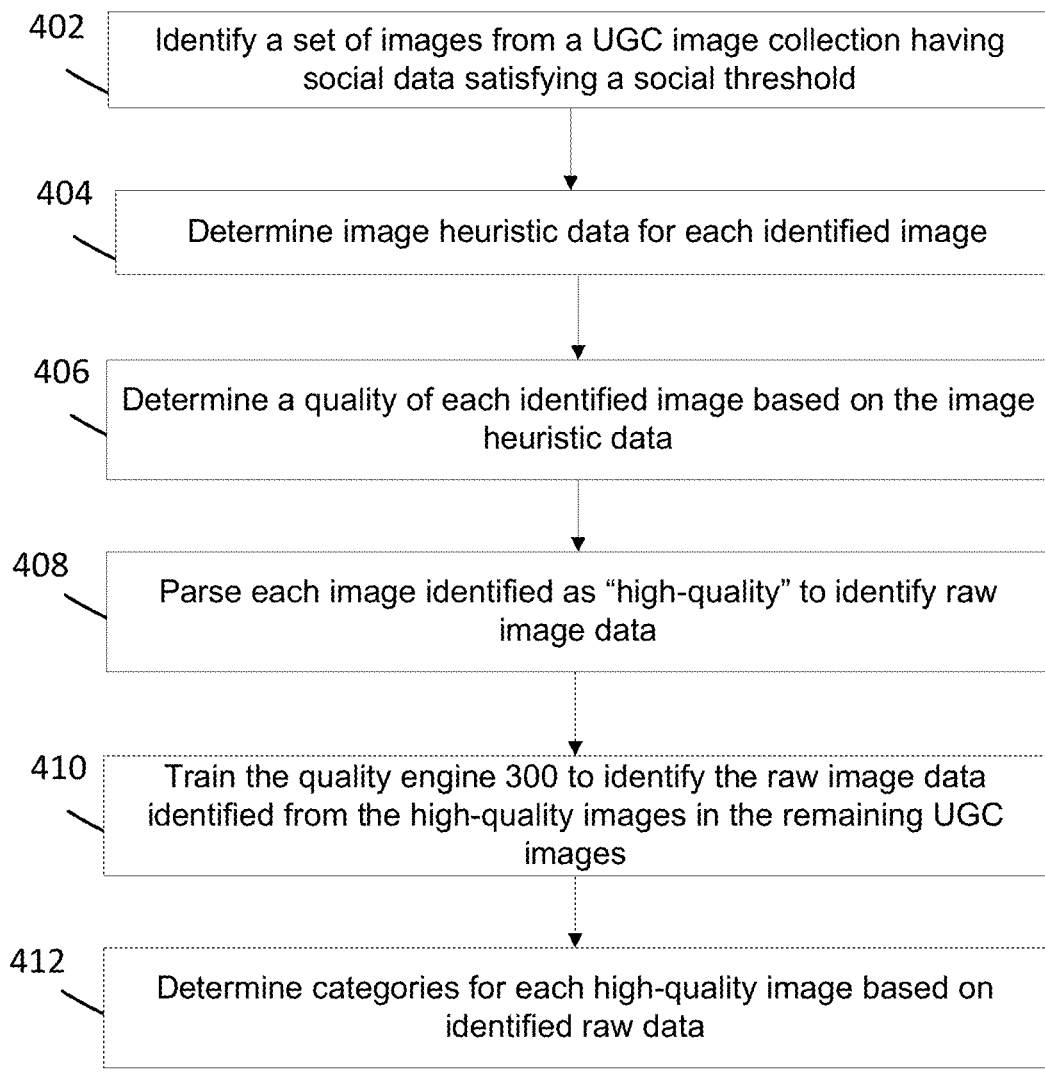

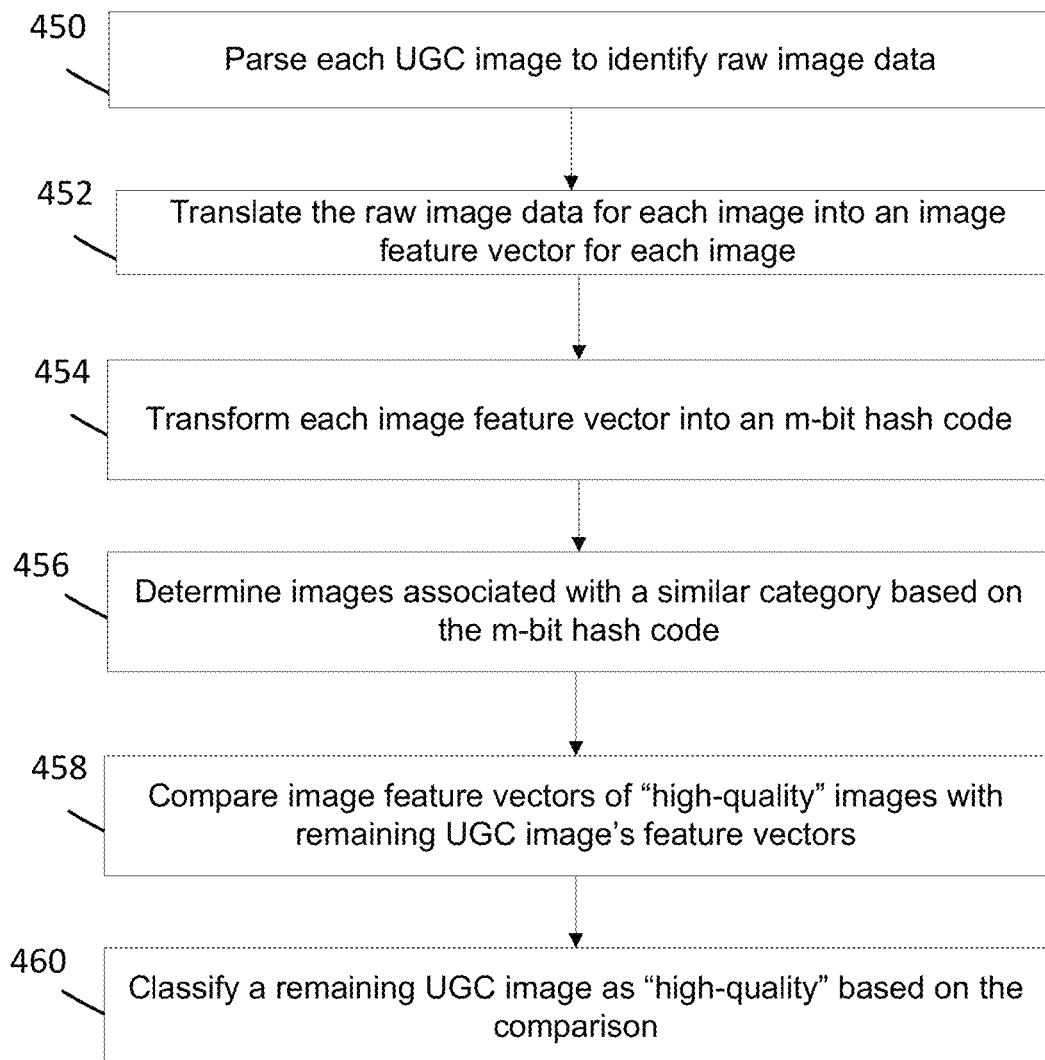

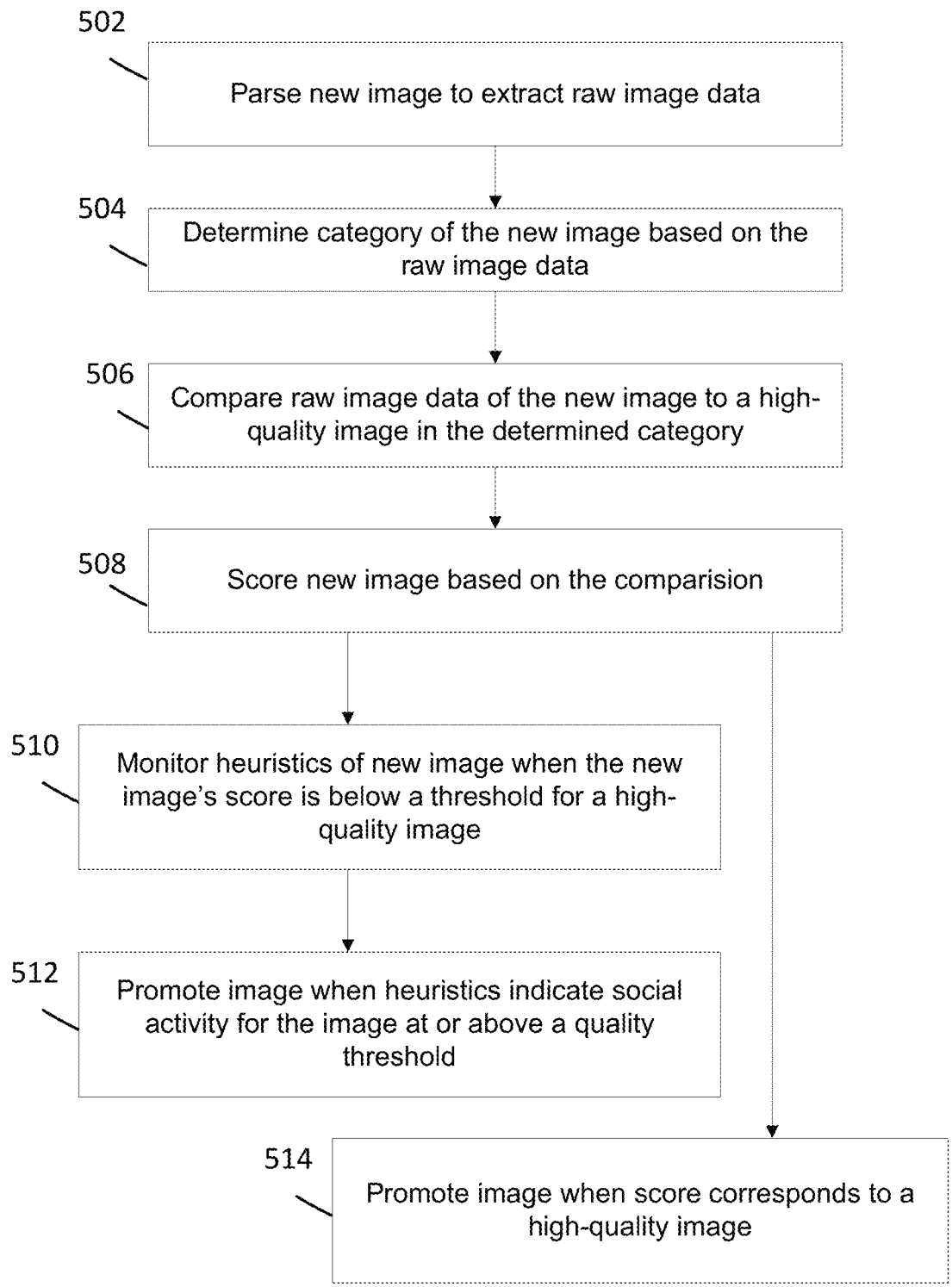

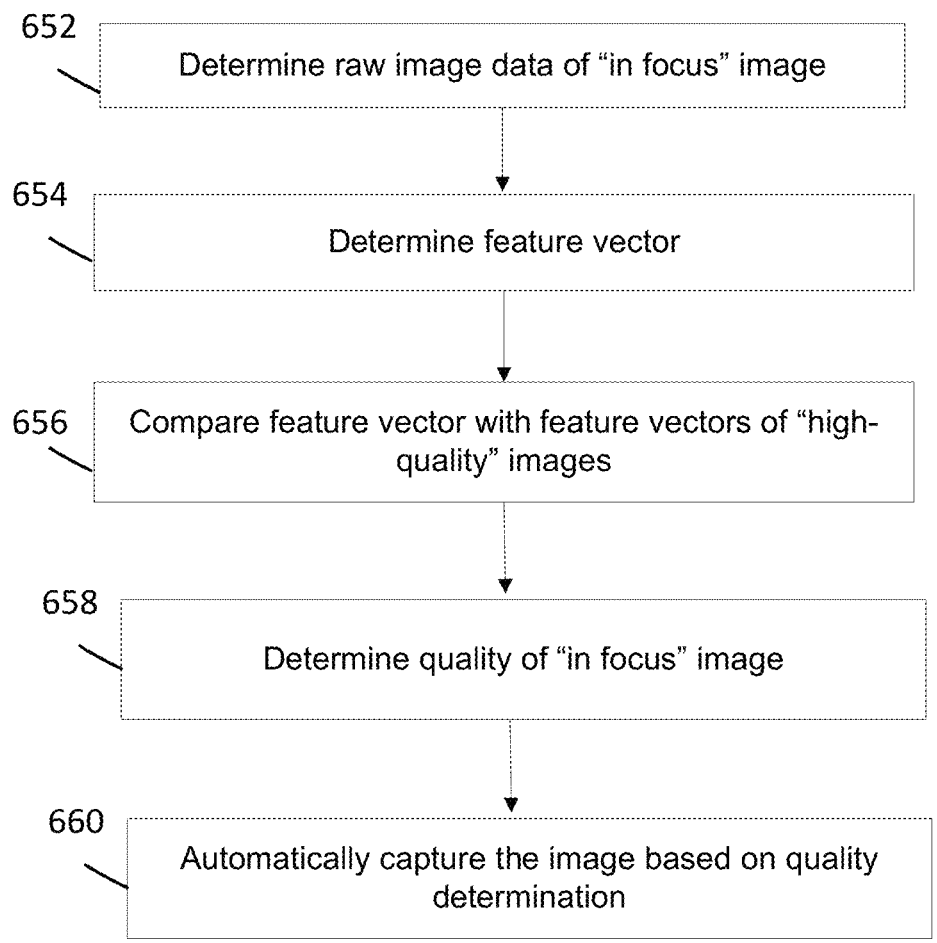

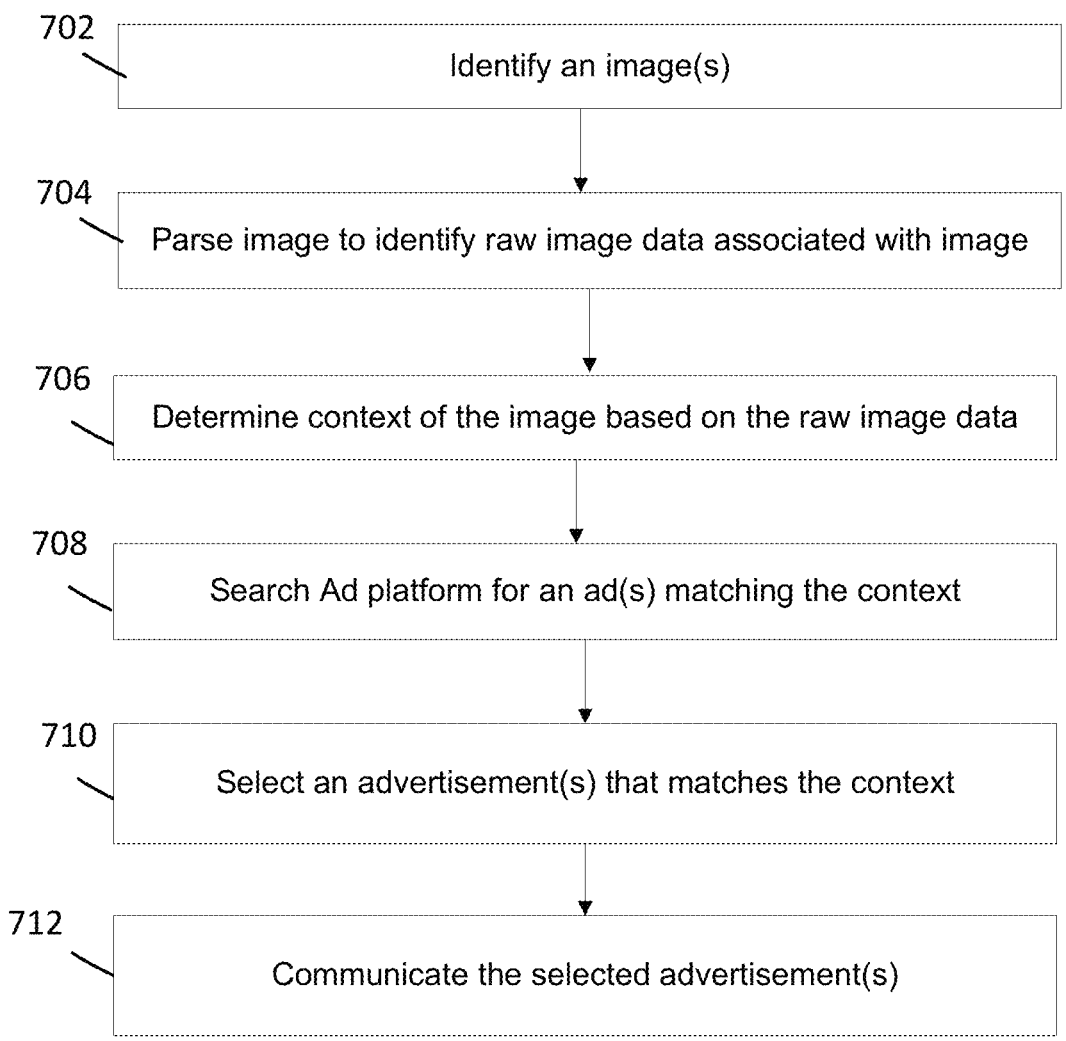

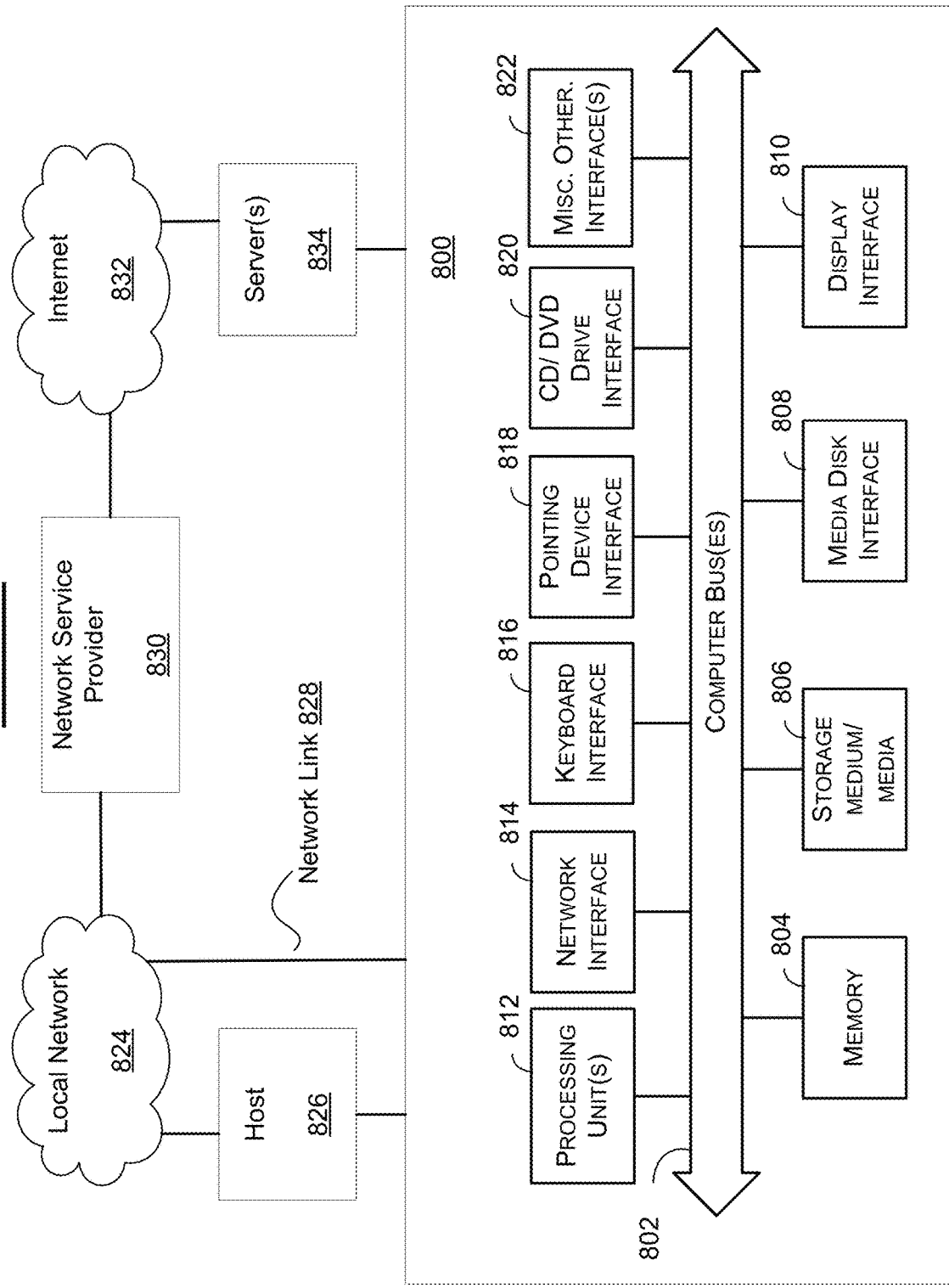

COMPUTERIZED METHOD AND SYSTEM FOR AUTOMATED DETERMINATION OF HIGH QUALITY DIGITAL CONTENT

CROSS REFERENCE TO RELATED APPLICATION

This application is a divisional of, and claims priority from co-pending U.S. patent application Ser. No. 14/816,516, filed Aug. 3, 2015, which is incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content generating, providing and/or hosting computer systems and/or platforms by modifying the capabilities and enabling non-native functionality to such systems and/or platforms for automatic discovery of high quality digital content.

SUMMARY

In general, the present disclosure provides systems and methods for automatic determination of high quality digital content. According to embodiments, the present disclosure describes improved computer system and methods directed to analyzing raw image data, such as features and descriptors of images, in order to identify the high quality images from a set of images. As discussed in more detail below, such images can be identified from a database of images, and such images can be identified in real-time, or near real-time during the capture of an image(s) by a camera.

According to some embodiments, the disclosed systems and methods enable the discovery of particular artistic works and/or artistic creators of such works from large scale user generate content (UGC) collections (e.g., Flickr®). According to some embodiments, the identification of such high quality images can occur during the process of capturing an image, via a user's camera-enabled device. For example, the disclosed systems and methods can identify when the image data in-focus in the camera's lens corresponds to a high-quality image, whereby the user can be alerted to the same fact or the picture can be automatically taken. In another non-limiting example, upon a user taking a series of photographs of a visually similar image (e.g., a burst of photographs), the disclosed systems and methods can determine which image is the best image from the set.

Therefore, according to some embodiments of the present disclosure, the disclosed systems and methods enable the discovery and/or identification of high-quality content objects (for example, images) not only based on the features of the content, but also based on structured and/or raw areas within and associated with such content. This enables the disclosed systems and methods to promote such content in a number ways. For example, such identified images can be featured in prominent areas on a website, or funneled into content licensing programs. Thus, the disclosed systems and methods can, for example: (1) effectuate the discovery of new, high quality content which can then be recommended to users; (2) improve the experience of talented new users (who typically lack a large following, and face a "cold start" problem); and (3) allow content curators to discover talented new users.

It will be recognized from the disclosure herein that embodiments provide improvements to a number of technology areas, for example those related to systems and processes that handle or process images for users or business entities, and provide for improved user loyalty, improved image publishing, improved advertising opportunities, improved image search results, and improved picture taking.

In accordance with one or more embodiments, a method is disclosed which includes analyzing, via a computing device, a collection of user generated content (UGC) images to identify a first image, the first image having associated social data indicating user interest in the first image below a social threshold; parsing, via the computing device, the first image to extract raw image data, the raw image data comprising features associated with content of the first image; identifying, via the computing device, a set of second images from the UGC collection, the second set of images being high-quality images, the identifying comprising identifying the raw image data of each of the second images; comparing, via the computing device, the raw image data of the first image with the raw image data of the second images, the comparison comprising identifying a similarity between the raw image data of the first image and the raw image data of each second image in accordance with a comparison threshold; determining, via the computing device, whether the first image is a high-quality image based on the comparison, the high-quality determination based on whether the similarity between the raw image data of the first image and the raw image data of each second image satisfies the comparison threshold; and communicating, via the computing device, information associated with the first image to at least one user when the first image is determined to be a high-quality image.

In accordance with one or more embodiments, a method is disclosed which includes capturing, via a computing device, a set of images, the captured images comprising raw image data generated from the capturing; parsing, via the computing device, the set of images to extract the raw image data, the raw image data of each image comprising features associated with content of each captured image; comparing, via the computing device, the raw image data of each image with raw image data of a second image, the comparison comprising identifying a similarity between the raw image data of the images and the raw image data of the second image; determining, via the computing device, a quality of each image based on the comparison, the quality based on the identified similarity; identifying, via the computing device, an image from the set of images having a highest quality; and communicating, via the computing device, information associated with the identified image to a user of the computing device.

In accordance with one or more embodiments, a method is disclosed which includes determining, via the computing device, image data of an image optically sensed by a lens of a camera associated with the computing device; analyzing, via the computing device, the image data to identify features associated with content of the depicted image; comparing, via the computing device, the image data with image data of a second image, the second image being a high-quality image, the comparison comprising identifying a similarity between the image data of the depicted image and the second image data in accordance with a comparison threshold; determining, via the computing device, a quality of the depicted image based on the comparison, the quality based on the identified similarity; and automatically capturing, via the computing device, the image using the camera when the quality satisfies a quality threshold.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for automatic discovery of high quality digital content.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4C are flowcharts illustrating steps performed in accordance with some embodiments of the present disclosure;

FIG. 5 is a flowchart illustrating steps performed in accordance with some embodiments of the present disclosure;

FIGS. 6A-6B are flowcharts illustrating steps performed in accordance with some embodiments of the present disclosure;

FIG. 7 is a flowchart illustrating steps performed in accordance with some embodiments of the present disclosure; and FIG. 8 is a block diagram illustrating architecture of an exemplary hardware device in accordance with one or more embodiments of the present disclosure.

DESCRIPTION OF EMBODIMENTS

Figure 1:
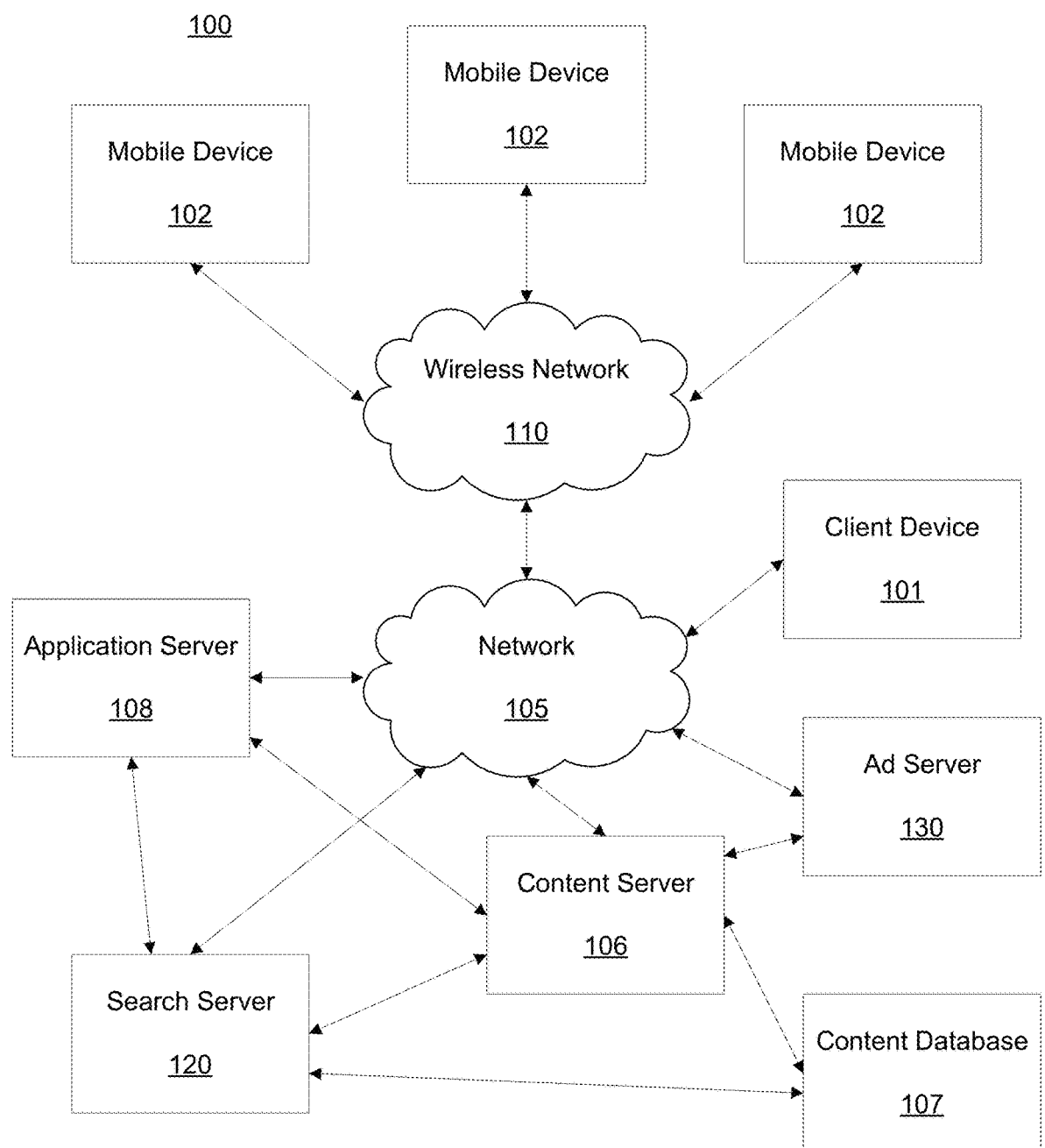
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, the size of digital image archives in recent years has been growing exponentially. The wealth of images on the Internet is ever-increasing due to archives of private users, marketers, content from news publishing agencies, internet communities, and the like. In line with the size of the archives, the difficulty of discovering new digital content has become increasingly difficult and costly.

Conventional systems for identifying new, interesting content have only achieved limited effectiveness due to weaknesses in the implemented schemes. For example, conventional systems are mainly based on low-level or hand-crafted features, which can only analyze very limited low-level descriptions about content and often fail to comprehensively identify new content, as they are focused on existing, trending, high-rated content. Additionally, such systems do not address how to identify content from a "cold start." That is, new content that does not have the applicable social indicators and/or identifiers indicating the content's quality and/or virality (e.g., user engagement within a community) are virtually undiscoverable through conventional systems.

The disclosed systems and methods remedy such shortcomings in the art and provide improved computer systems and methods instituting increased functionality to the computer executing the disclosed systems and methods by automatically identifying high-quality content. As discussed below, the identification of high-quality content can yield improvements in numerous technological fields, such as for example image search, content promotion and recommendation, image monetization, ad monetization, and/or content selection from a set of captured imagery, to name a few.

The disclosed systems and methods enable a content generating, hosting and/or delivery system/platform to overcome specific technical impediments, such as for example "cold starts" (i.e., newly created and/or uploaded content being undiscovered by users on a network due to the lack of viewership, followers and/or social interaction, and the like). For example, when content has had sufficient social interactions (e.g. views, likes, comments, shares, and the like), conventional systems can infer the quality of the content, and by proxy, the identifying information of the artist (or content creator). As discussed above, existing systems are generally devoid of any mechanism for discovering newly uploaded and/or created "cold" content (e.g., content that does not have the applicable social indicators and/or identifiers indicating the content's quality and/or user engagement/interest).

The disclosed systems and methods remedy these and other shortcomings by identifying new content and the artists/creators associated with such content based on the raw properties (i.e., features and descriptors) of such content. Such raw data analysis, as discussed in more detail below, is not performed or contemplated by existing systems. The disclosed systems and methods thereby enable the promotion of the identified content and/or artists which can lead to an identified artist being able to accumulate followers. As evidenced from the discussion herein, by engaging users with appropriate followers early on (e.g., upon joining a network or posting new content), the instant disclosure's discussed mechanisms for content discovery can assist in boosting users' retention within the social landscape of the Internet.

As discussed herein, the disclosed embodiments of systems and methods are directed to solving the technical challenge of identifying new high-quality content (e.g., images). For purposes of this disclosure, "new content" refers to content (e.g., images, text, video, audio, multimedia, RSS feeds, and the like) that has been recently created, uploaded, downloaded, or shared, or even re-blogged/re-posted, such that the presence of such content on a user's account page (e.g., Flickr® page) is a recent occurrence. Those of skill in the art will understand that "new" or "recent" refers to content's presence satisfying a recency threshold. For example, if the recency threshold is one week, the content posted to the user's Flickr® page during that week would qualify as "new content." In some embodiments, "new content" can also refer to content that does not have the requisite social indicators (e.g., a threshold amount of followers or viewership), as discussed above.

As understood by those of skill in the art, the term "high-quality" refers to an item of digital content satisfying a quality threshold, which can be set by a user, site administrator, artist creating/capturing the content, the system, or some combination thereof. In a non-limiting example, "high-quality" can refer to the digital content being of interest to a user(s), where interest (or user engagement) can be based on the number of times a user has interacted with the content (e.g., viewed, shared, commented, downloaded, re-blogged, re-posted, favorited, liked, and the like) at or above the quality threshold. In another non-limiting example, "high-quality" content can relay that the content is aesthetically pleasing or technically sound, in that the data associated with the content produces a resolution, focus, pixel quality, size, dimension, color scheme, exposure, white balance and the like, or some combination thereof that satisfies the quality threshold.

According to some embodiments, the disclosed systems and methods involve discovering new, high-quality artistic works and/or information associated with the artistic creators responsible for such works from large-scale user generated content (UGC) collections, such as, for example, Flickr®. As discussed in more detail below, the systems and methods discussed herein implement a machine learning quality model (referred to as the quality engine 300 below in relation to FIGS. 3-6B) (e.g., deep learning, in some embodiments) to an entire UGC collection. This effectuates a content quality model that can be built, maintained and updated in a purely data driven manner, reliant upon the raw data of the content being hosted by the UGC collection.

According to some embodiments, once such artistic works (e.g., images) have been discovered from a UGC, the disclosed systems and methods can then promote such content in a number of ways. For example, newly created and/or uploaded images can be featured in prominent areas on a website, made available for search or purchase/licensing, or funneled into content licensing programs. Such promotion is based on the raw properties of the content itself, whereby the social indicators have only an indirect influence on content's promotion. The disclosed systems and methods can, for example: (1) effectuate the discovery of new, high quality content which can then be recommended to users; (2) improve the experience of talented new users; and (3) allow content curators to discover talented new users, (4) and provide increased monetization opportunities.

For purposes of this disclosure, the identification of content will be in large measure directed to analyzing and discovering digital images; however, it should not be construed as limiting the scope of the instant application to solely images, as any known or to be known type of content or media (e.g., text, video, audio, multi-media, RSS feeds, and the like) is applicable to the disclosed systems and methods discussed herein.

According to some embodiments, as mentioned above, the disclosed systems and methods can also enable the identification of high-quality images during, prior and/or immediately after capturing an image. That is, the trained quality model mentioned above, and discussed in more detail below, provides additional, non-native functionality to a device having picture taking capabilities to perform an aesthetics awareness determination to assist in producing high-quality images. According to some embodiments, the functionality discussed herein can be provided as a downloadable application that executes in conjunction with the hardware and software associated with a device's camera or can be implemented in a camera or image capture device. As used herein, the term camera is broadly intended to mean any device capable of capturing image data, whether in the optical, infrared or electromagnetic spectrum. In some embodiments, the functionally discussed herein can be implemented as added functionality to the operating system and/or software of the device taking the picture.

According to some embodiments, the disclosed systems and methods enable the selection of the best photograph(s) from a series of taken photographs. In some embodiments, the disclosed systems and methods can effectuate auto-focusing of a camera's lens or auto-filtering of the image data "in focus" to capture the best picture based on the learned/trained quality modeling discussed above. That is, the disclosed systems and methods can perform real-time, on-the-spot analysis of the image data that is in-focus in a camera's image capture components to determine when the best possible picture is possible to be captured (which, in some embodiments, can be attributable to the camera's capabilities, underlying hardware and/or executing software, camera's settings and current imaging environment). As discussed in more detail below, the analysis of the image data captured or in-focus, including the raw data (e.g., features and descriptors) of the image, can involve determinations of, for example, resolution, pixel quality, size, dimension, color scheme, exposure, white balance and the like.

For purposes of this discussion, the term "capture" is intended to mean the process by which a device obtains a digital image, for example through use of a camera's vision/image/thermal/IR/sonar or other sensor (e.g., lens and CCD combination and the like). The sensor can identify a frame (for a still photograph) or frames of imagery (for video frames) and convert the sensed information into digital values (the digital values are referred to as image data below). These digital values can be fed to a volatile or non-volatile memory associated with the camera device. Thus, as one of skill in the art would understand from the discussion below, the instant disclosure involves embodiments where 1) a camera captures an image (i.e., actually takes and stores or saves the picture—FIG. 6A); and, 2) where the image data being read by the vision sensor is analyzed prior to actually "taking" the picture (e.g., prior to capture during or after viewing or focusing or when in focus—FIG. 6B).

According to some embodiments, the analysis of captured or focused (e.g., in focus in the camera lens or image capture component) image can be utilized to further train the quality model. That is, in some embodiments, the determinations of the features and descriptors of the image data can be fed back to the quality model using a recursive or bootstrapping function in order to continually update, or personalize the aesthetic determinations, styles, data and data types. In some embodiments, such analysis can also be utilized to optimize parameters of an image filter, as commonly used on Flickr®, Instagram™ and the like, where optimized filters can be implemented per site, or per user. Such optimization can automatically occur prior to taking the picture, during image capture, or immediately after image capture thereby ensuring an image is a high quality image. In some embodiments, such optimization can be effectuated on the client-side application, or on the server-side upon uploading the picture to the website associated with the application being used to capture the photograph.

As such, the disclosed systems and method involve embodiments for identifying new, high-quality images from 1) a UGC collection of images (e.g., Flickr®) and/or 2) from pictures taken or in-focus on a camera. As discussed in more detail in relation to FIGS. 3-6B below, the disclosed systems and methods can analyze image data (e.g., features and descriptors such as, but not limited to image pixels) to produce an aesthetic score for an image. In some embodiments, this score, which is part of the quality modeling of a UGC collection, as mentioned above and discussed below in more detail, can be utilized to identify the quality of determined new images, whereby determined high-quality images can be promoted to other users within the online community (e.g., within Flickr®) or across network platforms (e.g., posting a message on Twitter® about the Flickr® image). In some embodiments, the scoring of UGC images can be utilized as a basis for selecting the best photograph from a series of photographs taken by a camera, or for capturing (or alert a user to) a high-quality image that is in-focus in the camera's lens.

As discussed in more detail below, according to some embodiments, information associated with or derived from the determined or discovered (e.g., previously uncovered) content, as discussed herein, can be used for monetization purposes and targeted advertising when providing, delivering or enabling access to such content. That is, providing targeted advertising to users associated with such discovered content can lead to an increased click-through rate (CTR) of such ads and/or an increase in the advertiser's return on investment (ROI) for serving such content provided by third parties (e.g., advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, search server 120 and advertising ("ad") server 130.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, social networking services, news services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-102. In some embodiments, applications, such as a blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
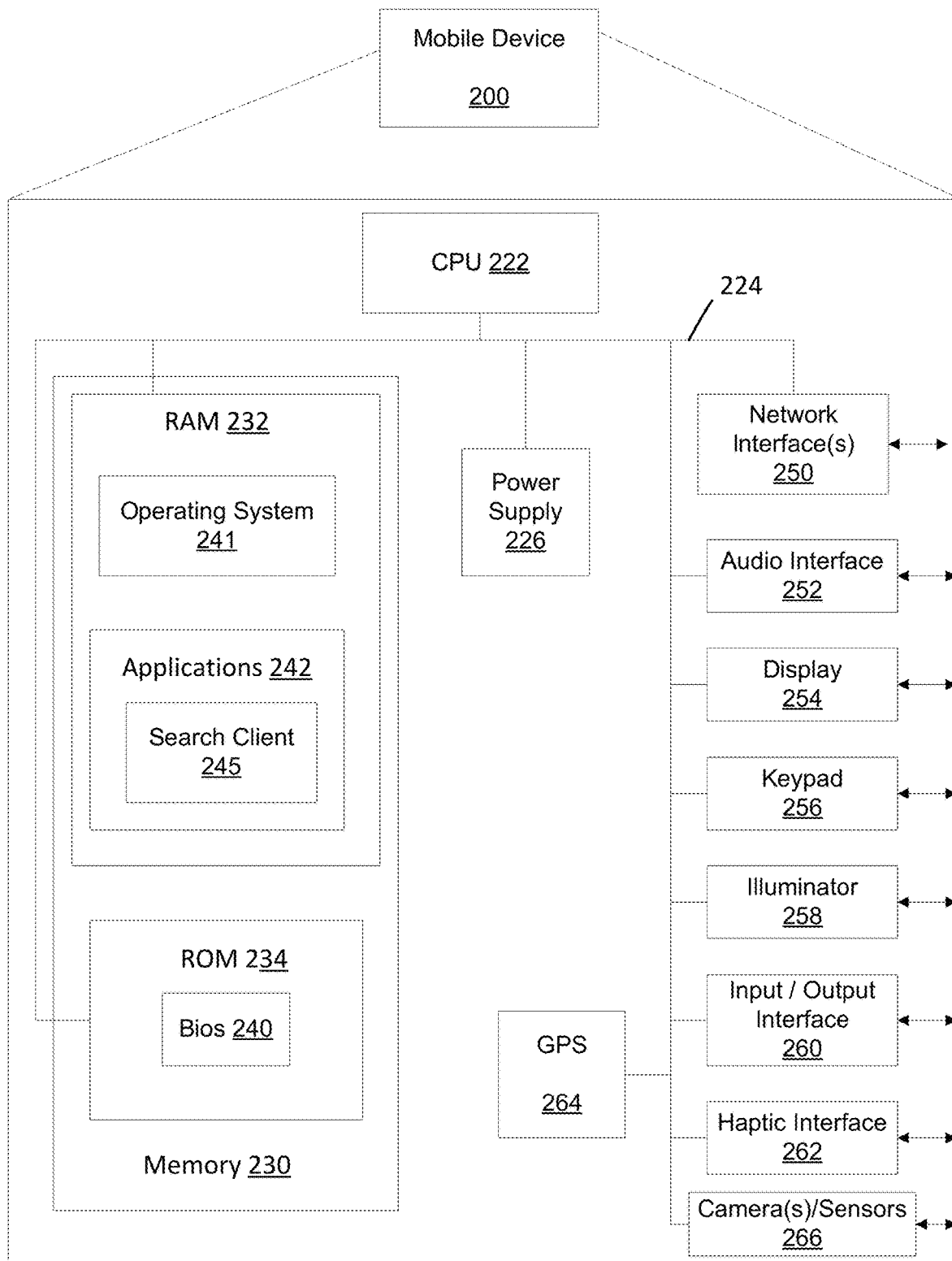
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs or "apps" in some embodiments include calendars, browsers, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
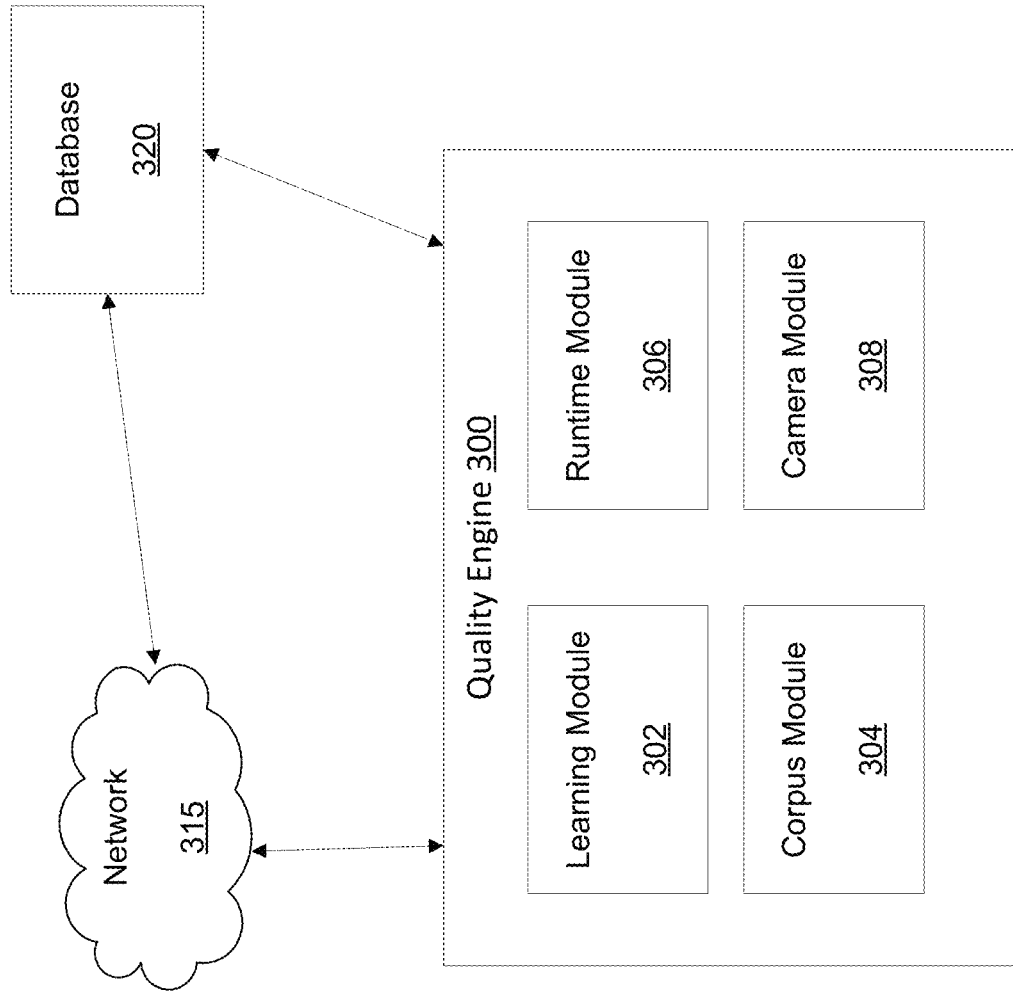
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a quality engine 300, network 315 and database 320. The quality engine 300 can be a special purpose machine or processor and could be hosted by an application server, content server, social networking server, web server, search server, content provider, email service provider, ad server, user's computing device, and the like, or any combination thereof. The database 320 can be any type of database or memory, and can be associated with a content server on a network (e.g., content server 106, search server 120 or application server 108 from FIG. 1) or a user's device (e.g., device 102 or device 200 from FIGS. 1-2). Database 320 comprises a dataset of images, user data and associated user metadata. Such information can be stored in the database 320 independently and/or as a linked or associated dataset. It should be understood that the image data (and metadata) in the database 320 can be any type of image information and type, whether known or to be known, without departing from the scope of the present disclosure.

As discussed above and in more detail below, the image data/metadata provides the basis for the raw image data (e.g., features/deep descriptors) of the images. Such raw image data can be directly based on the information contained in the data/metadata and associated with the content of an image; and in some embodiments, as discussed below, the raw image data can be derived from such image data/metadata.

For purposes of the present disclosure, as discussed above, images (which are stored and located in database 320) as a whole are discussed within some embodiments; however, it should not be construed to limit the applications of the systems and methods discussed herein. Indeed, while reference is made throughout the instant disclosure to images (or pictures), other forms of user generated content and associated information, including for example text, audio, video, multi-media, RSS feed information can be used without departing from the scope of the instant application, which can thereby be communicated and/or accessed and processed by the quality engine 300 according to the systems and methods discussed herein.

According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or delivering images, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the quality engine 300, and the database of stored resources 320. Indeed, as illustrated in FIG. 3, the quality engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as quality engine 300, and includes a learning module 302, corpus module 304, runtime module 306 and a camera module 308. It should be understood that the engine(s) and modules discussed herein are non-exhaustive, as additional or fewer engines and/or modules (or submodules) may be applicable to the embodiments of the systems and methods discussed. The operations, configurations and functionalities of each module, and their role within embodiments of the present disclosure will be discussed with reference to FIGS. 4A-7.

FIG. 4A is a process 400 diagram illustrating steps performed in accordance with exemplary embodiments of the present disclosure for automatically identifying high-quality content. Process 400 is performed by the quality engine 300, and specifically by the learning module 302 and the corpus module 304, which are special purpose modules as detailed below. The quality engine 300, through models 302 and 304 can model a collection of images. Such modeling is performed for purposes of identifying high-quality content, which, as discussed below, can be used for identifying other new high-quality content for promoting such content thereby remedying a "cold start" (as discussed below in relation to FIG. 5), and for selecting and/or determining high-quality captured content by a camera (as discussed below in relation to FIGS. 6A-6B).

Process 400 focuses upon modeling an image database to effectuate cost effective and computationally efficient identification of high-quality images. Such content, as discussed herein, can be images of and/or associated with a user generated content (UGC) collection, or images captured by a camera, whether stored in the camera's memory upon capture or in-focus within the camera's lens. While the discussion herein focuses upon the identification of images (e.g., image data and metadata), it should be understood that the present disclosure is not so limiting, as the disclosed systems and methods can be applied to any known or to be known type of content object/item, including, but not limited to, text, video, audio, RSS feeds, or other types of multimedia, including any known or to be known type of message, content object or item, or data stored in a datastore.

Process 400 involves the training of the quality engine 300 (i.e., the learning module 302 for Steps 402-408 and corpus module 304 for Steps 410-412, discussed below) based on the raw image data of images in a UGC collection (e.g., Flickr®). As discussed herein, Process 400 trains the quality engine 300 on data that has been collected using strong social indicators of quality, which are then applied to content that has no such indicators.

According to embodiments of the present disclosure, social indicators are based on social data retrieved, accessed, identified, received and/or communicated to, from and/or between users on an electronic social network. Such information can be derived, determined and/or identified from messages being transmitted and/or posted over the Internet respective to an image via any type of known or to be known social media or communication platform, such as, but not limited to, Yahoo!® Messenger, Flickr®, Tumblr®, Facebook®, Twitter®, Instagram™, Wikipedia®, or any other type of blog, microblog, news posting, or website or webpage, and the like. For example, such information can be comprised within a user comment about an image posted to another user's Flickr® page (or dashboard), which can potentially be read by the entire world or anyone on the world-wide Flickr® community. In another example, such information can be comprised within interactions between specific users, such as IM messages, Twitter®, Facebook® messages, and the like, which correspond to an image (e.g., tweeting an image, or a URL of an image).

In line with the above non-limiting examples, in addition to any other known or to be known methodology of users communicating over the Internet, such communications effectively yield knowingly and/or voluntarily generated and/or shared content that can be analyzed, collected and utilized for a variety of purposes, as discussed herein. In some embodiments, the disclosed social data can include and/or be associated with spatial data, temporal data and/or logical data (where the logical data can be extracted from the communications to determine and/or reveal a topic of such communications). Such social, spatial, temporal and/or logical data can be related to and/or generated from an image, an image's source (e.g., a network location hosting the image or the creator of the image), and the like. For example, temporal data of an image can be related to when the image was captured, or when the image was posted to a user's Flickr® page. Spatial data can be related to the location of the image. Logical data can be related to topical and/or a categorical representation of the image.

Process 400 begins with Step 402 where a set of images from a UGC collection (e.g., database such as the Flickr® datastore) that satisfy a social threshold are identified. That is, Step 402 involves analyzing the images in the UGC collection to identify at least a predetermined number of images in the UGC collection that have associated social data satisfying the social threshold. Such analysis can occur across the entire UGC collection, per user, or for a determined subset of images (e.g., images tagged or labeled as being related to a category). The social threshold serves as a minimum threshold for identifying images that have been subject to a particular amount of social activity (e.g., having the requisite social indicators for training the quality engine 300).

In some embodiments, the identification of images having the requisite social data associated therewith can be based on the image being involved in a certain amount of social activity over a period of time at or above the social threshold. For example, if an image has been shared, retweeted, favorited, saved, and the liked, a certain number of times over a time period at or above the social threshold, then such image would be identified in Step 402.

In some embodiments, Step 402 may involve identifying images from known image creators (e.g., famous or recognizable artists, publishers, content hosts, and the like). For example, the movie studio MGM® typically posts pictures associated with upcoming movies on their Tumblr® page. As a result, MGM's account typically has a reliable number of followers and therefore a high volume of social activity respective to such images; thus, for example, Step 402 can involve identifying images from MGM's Tumblr® page as the set of images.

Step 404 then involves determining image heuristic data for each of the images in the identified set from Step 402. In some embodiments, the determination of heuristic data is based on a calculation of the social data of each image respective to a number of views the image (or page hosting the image) receives:

Social Data/# of Views

By way of a non-limiting example, if an image has associated social data indicating that the image receives 20 shares after receiving 30 views, then the image heuristic data for that image would involve information indicating that two-thirds of the time the image is shared upon viewing.

In some embodiments, the determination of heuristic data is based on a calculation of image data of each image relating to the features or descriptors of the image. For example, analysis of an images data, whether it is the resolution, pixel quality, size, dimension, color scheme, exposure, white balance (or other type of image characteristic) would reveal if the image's picture quality satisfies the quality threshold (e.g., the aesthetic quality of the image is at a certain level).

For purposes of this disclosure, the discussion will focus on a calculation of image heuristic data being based on the social data of an image (e.g., a number of views); however, one of skill in the art should understand the instant disclosure is not so limiting. That is, any number of known or to be known data calculations, combinations and/or permutations associated with an image can be utilized to determine the image heuristic data for an image. In some embodiments, any known or to be known real-time (or near real-time) data analytics, measurements and/or weighting factors used for understanding a context of an image's influence on a network (or across other users) can be utilized herein. Indeed, Step 404 (and Step 406 below) can involve sophisticated data analysis (for distinguishing image data between images in a UGC collection), time consideration (for determining when certain images are significant based on temporal data of the image and the current time/date, which can be based on a context, content and/or sentiment of the image), influence analysis (for understanding the potential impact certain users have on the image being viewed by others), and network analysis (for determining how the image migrates or propagates across a network).

In Step 406 a determination is made regarding the quality of the images in the identified set of UGC images based on the analysis in Step 404. As discussed above, an image can be determined to be "high-quality" when information associated with the image indicates that the image is of interest to a number of users, contains a certain picture quality, is associated with a particular artist or some combination thereof, at or above the quality threshold. In some embodiments, the determination of an image's quality results in the image being tagged or embedded with metadata indicating the determination's result, and/or having information indicating the image's quality stored in association with the image. In some embodiments, such tagging/metadata can relay a zero or "0" indicating that the image does not satisfy the quality threshold, and in some embodiments, a one or "1" can be associated with the image indicating that the image is a high-quality image (thereby satisfying the quality threshold).

In some embodiments, if an image's heuristic data falls below the quality threshold, then the image would be designated as not "high-quality". For example, building on the example above, the image received 20 shares from 30 views, resulting in a 66% share rate. If the quality threshold was set at 70%, then this image would not be determined to be of "high-quality"—it does not have the requisite interest from users on a site, network, group or category, for example. Therefore, the image would be tagged, embedded or otherwise associated with information designating the image as a "0". In another non-limiting example, if the quality threshold was set at 60%, then the image would be designed with a "1" indicating the image as being "high-quality."

In Step 408, the identified high-quality images are then analyzed to identify raw image data within/among such images. The analysis occurring in Step 408 involves parsing each high-quality image and extracting the raw image data. In some embodiments, such analysis involves applying a "deep learning" algorithm to the high-quality images to determine the raw image data of each image (i.e., the features and descriptors).

In accordance with embodiments of the present disclosure, "deep learning" (also referred to as deep structured learning or hierarchical learning) involves machine learning algorithms that model high-level abstractions in data by using model architectures composed of multiple non-linear transformations. Deep learning is part of a broader family of machine learning methods based on learning representations of data. An image can be represented in many ways such as a vector of intensity values per pixel, or in a more conceptual way as a set of edges, regions of particular shape, and the like. The implementation of deep learning as part of the disclosed systems and methods enables the replacement of handcrafted features with efficient algorithms for unsupervised or semi-supervised feature learning and hierarchical feature extraction from images.

In some embodiments, Process 400 (i.e., Step 408) can be implemented using any known or to be known deep learning architecture or algorithmic technique, such as, but not limited to, deep neural networks, artificial neural networks (ANNs), convolutional neural networks (CNNs), and deep belief networks can be utilized herein. According to some embodiments, as discussed in more detail below, the disclosed deep learning methodology employs CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, rectified linear unit (ReLU) layer, pooling layer, dropout layer and loss layer, as understood by those of skill in the art. When used for image discovery, recognition and similarity, CNNs produce multiple tiers of deep feature collections by analyzing small portions an image.

For purposes of this disclosure, the discussion will reference vector representations of images (as discussed below); however, it should not be viewed as limiting as any type of known or to be known machine learning or deep learning analysis and/or transformation is applicable to the discussion herein without departing from the scope of the present disclosure.

For purposes of this disclosure, raw image data, referred to as features and/or descriptors can include, but are not limited to, visual characteristics of the images characterized (or categorized and labeled) by color features, texture features, type features, edge features and/or shape features, and the like. The results of these collections are then tiled so that they overlap to obtain a better representation of the image; which is repeated for every CNN layer. CNNs may include local or global pooling layers, which combine the outputs of feature clusters.

One advantage of CNNs is the use of shared weight in convolutional layers; that is, the same filter (weights) is used for each pixel in each layer, thereby reducing required memory size and improving performance. Compared to other image classification algorithms, CNNs use relatively little pre-processing which avoids the dependence on prior-knowledge and the existence of difficult to design hand-crafted features.

It should be understood by those of skill in the art that the features (or descriptors or deep descriptors) of images can include any type of information contained in, or associated therewith, image data, video data, audio data, multimedia data, metadata, or any other known or to be known content that can be associated with, derived from or comprised within the content item (or media file). In some embodiments, such feature data can be audio data associated with an image (or media file) that plays when the image is viewed, for example. In another example, feature data can include comments or user feedback (e.g., comments on a social network) that is associated with not only the image file, but also data associated with the source of the file.

In Step 410, the quality engine 300 is trained to identify information associated with the identified raw image data extracted in Step 408. Step 410 involves training the learning module 302 with information that module 302 can use when analyzing another subset of images.

According to some embodiments, the training occurring in Step 410 involves the corpus module 304 analyzing the remaining images in the UGC collection (i.e., those images not identified in Step 402) to determine which images have corresponding raw image data to the identified high-quality raw data from Step 408. Such analysis of the remaining UGC collection is performed in a similar manner as discussed above in relation to Step 408. The remaining images are parsed and their raw image data is extracted. Then, a comparison is performed between the raw image data identified in Step 408 and the raw image data of the remaining images. If an image has raw image data matching that of an identified high-quality image (at or above a comparison threshold), then that image is classified as "high-quality" in a similar manner as discussed above in relation to Step 406. Such comparison can be performed by any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like.

Figure 4C:
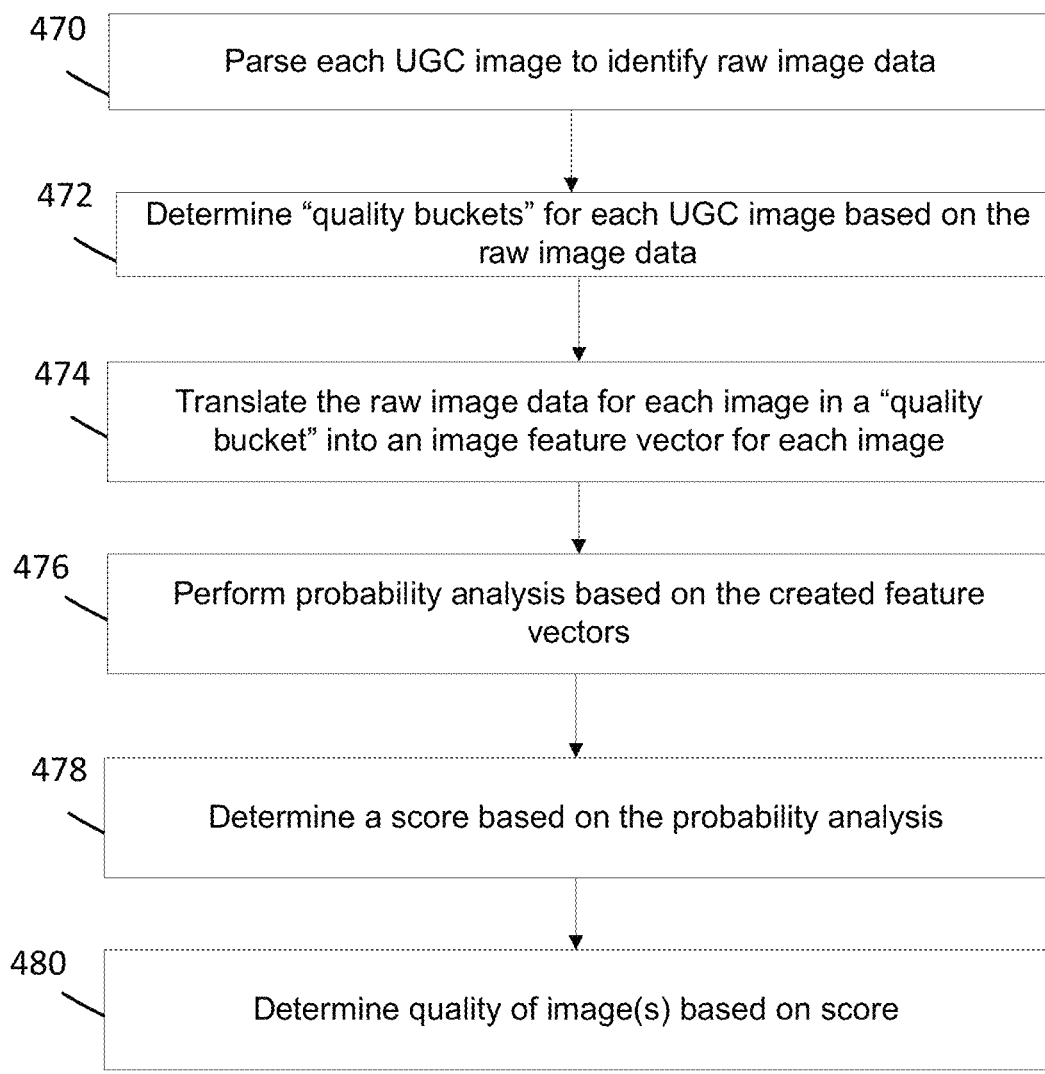

According to some embodiments, Step 410 involves the determination of raw image data for each image in the UGC collection (or within another subset of the UGC collection). As illustrated in FIGS. 4B-4C, the process of Step 410, in some embodiments, includes steps (or sub-steps) 450-460 and 470-480, respectively.

According to some embodiments, as in FIG. 4B which details a non-limiting embodiment of Step 410, Step 450 involves parsing each UGC image to identify the raw image data for each UGC image, as discussed above. In Step 452, the raw data for each image (the high-quality images and the other UGC collection images) is then translated into an image feature vector having a dimensional value proportional to the pixel value of each image. According to some embodiments of the present disclosure, the feature vector is a result of forward propagation of the raw data values through the layers of the CNN. For example, using a 4096 pixel product image as the test image, such propagation results in a 4096 dimensional feature vector. In Step 454, the feature vector is transformed into an m-bits hash-code (e.g., a deep hash code (DHC) or byte array) by applying any known or to be known Eigen-hash algorithm (e.g., spectral hashing) to the feature vector. As understood by those of skill in the art, an Eigen-hash algorithm can produce compact m-bit codes from data-points of a feature vector so that the Hamming distance (or other known or to be known type of distance calculation) between m-bit codes correlates with a semantic similarity. That is, in Step 456, a determination is made regarding which images correspond to similar content (or a similar category). This determination can be based on analysis of the m-bit codes for each image, as discussed above. Then, in Step 458, for each image in the same category, the image feature vectors of those images identified as "high quality" (as discussed above) with the remaining UGC images in the same category are compared. As in Step 460, this comparison results in a semantic similarity being determined based on the comparison of feature vectors, as discussed above. That is, if the semantic similarity of data points of each vector is at or above the comparison threshold for a comparison between an established high-quality image (from Step 406) and a UGC collection image, then the UGC collection image is classified as high-quality. As discussed above, this comparison can be based on any type of known or to be known deep learning, comparison or data mining algorithm.

According to some embodiments, FIG. 4C details another non-limiting embodiment of Step 410. The process begins with Step 470 which involves parsing each UGC image to identify the raw image data for each UGC image, as discussed above. In Step 472, the raw data for each image is utilized to determine (or identify) the different "quality buckets" (or categories or distinct collections of related data) the UGC images may correspond to. In some embodiments, the identity of each UGC bucket can be based on any known or to be known type of compilation heuristic applied to the raw image data. For example, the raw data for each image may indicate social signals associated with the image, which can be determined to be reliable upon an indication that such social signals satisfy an interaction threshold—for example, a lower bound on the total number of views. In some alternative embodiments, the identity of an image may be based on annotations associated with the media—annotations by users, a capturing, creating, communicating and/or rendering computer, or some combination thereof. In some embodiments, the resultant quality buckets of Step 472 can be referred to as "labeled data" that can be used for training.

In Step 474 a model is then trained to predict which of the determined quality buckets a test image falls into. Such training can be performed by any known or to be known machine learning classification methodology, algorithm or technology, for example, but not limited to, stochastic gradient descent on a log-likelihood cost function. As such, it should be understood by one of ordinary skill in the art that FIG. 4C is the embodiment of a machine learning classifier integrated with or otherwise working along with or in communication with or as an ancillary function of a deep neural network of UGC image data.

In some embodiments, the training in Step 474 involves the creation of a feature vector for the test image (and images to which the test image will be compared). As discussed above, the raw image data is the translated into points forming an n-dimensional vector. In some embodiments, the feature vector for an image is the transformation of the image's pixel data into vector points, as discussed above; however, the feature vectors discussed herein can have "separating hyperplanes" on top of the space of all created feature vectors. The "separating hyperplanes" provide boundaries of data, where such boundaries can be indicative of the "bucket" (by way of non-limiting example a label) of the image, or annotations of the image, or other factors derived, determined or otherwise identified from the raw image data (by way of non-limiting example social data associated with the image), as discussed herein.

In Step 476, a probability analysis is performed to determine whether the proper classification of the image(s) will occur based on the created feature vector(s). According to some embodiments, in a similar manner as discussed above, analysis of the feature vectors, per bucket, against a test image, involves a comparison of the data points along the respective feature vectors. In some embodiments, such comparison can also include a comparison of the hyperplanes' of each image. Such analysis can be performed by any known or to be known computerized probability algorithm or technology, such as, but not limited to, probability bounds analysis, Bayes analysis, risk analysis, Monte Carlo analysis, and/or any other type of known or to be known algorithmic probability analysis.

In Step 478, a score for the test image is determined based on the probability analysis occurring in Step 476. The score is compared against a quality threshold in order to determine the quality of the image(s). Step 480. In some embodiments, the test image is determined to be "high-quality" (in accordance with an identified bucket) if the score satisfies the quality threshold; however, if the score falls below the threshold, then the image can be identified as "low quality". In some embodiments, the scores of entire labeled images (or images in a UGC bucket) can be combined into a single quality score for the purpose of ranking each image within the set (or bucket), such that a designation of each image's quality can be determined to be "high quality" or "low quality".

In Step 412, a category determination is made for each high-quality image. In some embodiments, such determination can be made respective to each high-quality image identified in the UGC collection; and in some embodiments, such determination can be made respective to the high-quality images from the set of images; in further embodiments, such a determination can be made directly from a trained model, as discussed above. Therefore, if an image's raw data indicates that the image's content is associated with a particular topic, then a label can be applied to the image (either as a tag, embedded data/metadata, or some other known or to be known form of category identification). According to some embodiments, the determination of a category can be based on a similar analysis of the raw data for determining if an image is "high-quality," as discussed above in relation to Steps 406-408. That is, a feature vector can be produced based on the image, and analysis of the features respective content of the image can indicate a type of content of the image. For example, if an image's vector content code(s) falls within an m-bit dimension associated with "finance", then that image would be categorized as "finance." In some embodiments, according to the classifier framework embodiments discussed above, the probability that the model assigns the label "finance" directly forms the basis upon which the image would be categorized as "finance."

Turning to FIG. 5, Process 500 details the steps for implementing the trained quality engine 300 (from Process 400) for identifying a new, high-quality images. Process 500, which is performed by the runtime module 306 of the quality engine 300, details the computerized methodology for identifying an image in a UGC collection that does not have the applicable social indicators and/or identifiers indicating the content's quality and/or user engagement/interest (e.g., a newly created and/or uploaded image). According to some embodiments, as discussed below, the focus of Process 500 is to identify new, high-quality images that can be promoted to others users as recommended content, and/or utilized for marketing purposes.

By way of non-limiting example of Process 500 (and Process 400), solely in order to provide an illustrative embodiment of the present disclosure, user Bob is at the NBA® Finals and takes a picture of LeBron James on the court. Bob uploads this picture to his Flickr® page. Since this picture was recently uploaded, and is associated with a topical subject given that the NBA finals are currently on going, the image would likely be a source of interest not only to Bob's friends on Flickr® (e.g., the users that follow his images), but also across the network. As such, Process 500 can apply knowledge from the quality engine 300 (as discussed above) and identify that Bob's new picture is "high-quality" (e.g., it corresponds to a topic of interest to many users). As discussed in more detail below, Bob's picture can be recommended to other users. In some embodiments, Bob's picture can be utilized as a basis for serving promotions (e.g., ads) as it is discovered that Bob's picture is of interest to many users (i.e., "high-quality") and as a result an advertiser could leverage such interest in implementing a marketing strategy around the picture's presence on Flickr®.

For purposes of this discussion, the identification of content will focus on analyzing and discovering digital images; however, it should not be construed as limiting the scope of the instant application to solely images, as any known or to be known type of content or media (e.g., text, video, audio, multi-media, RSS feeds, and the like) are applicable to the disclosed systems and methods discussed herein.

Process 500 begins with Step 502 which is based on an identified new image to a UGC collection (e.g., a user's page on Flickr®). As discussed above, a "new" image refers to an image that has been recently created and uploaded to a UGC collection, whereby the presence of such image on a user's account page (e.g., Flickr® page) is a recent occurrence (i.e., the time the content was updated to the current time satisfying a recency threshold). In some embodiments, "new" may also refer to an image being downloaded, shared, re-blogged/re-posted, favorited and the like; however, for purposes of this discussion, Process 500 will deal with an newly uploaded image; however, it should not be construed as limiting, as any known or to be known manner of creating and/or posting digital content can be utilized herein without departing from scope of the instant disclosure.

In some embodiments, Step 502 involves analyzing the images in the UGC image collection to identify images that do not have the requisite social indicators satisfying the social threshold, as discussed above in relation to Steps 402-404. That is, for example, images that are not currently being followed, shared or otherwise communicated between users or posted as messages at or above a threshold value. Such images, as discussed above, can be identified as "new" images. In some embodiments, Step 502 can be triggered upon a search for new content, whether from a user or an application; however, for purposes of this disclosure the discussion will focus on a user uploading an image; however, it should not be construed as limiting as any event can trigger Process 500 beginning to identify high-quality images as discussed herein.

Upon upload, Step 502 further involves analyzing the new image to identify the new image's raw image data. As discussed above, such analysis involves parsing the image and extracting the raw image data (e.g. features and descriptors of the image). That is, in some embodiments as discussed above, Step 408 involves applying a deep learning algorithm (or any other known or to be known data extraction algorithm) to the new image to determine the raw image data of the new image.

In Step 504, a determination is made as to a category the new image is associated with. In some embodiments, this can be determined, derived, or otherwise identified from a tag the uploading user associates with the image (for example, a hashtag). In some embodiments, the category determination is based on analysis of the raw image data identified in Step 502. That is, in a similar manner as discussed above in relation to Step 412, analysis of the new image's raw data can indicate that the image's content is associated with a particular topic, whereby a label can be applied to the image (either as a tag, embedded data/metadata, or some other known or to be known form of category identification). According to some embodiments, the determination of a category can be based on a similar analysis of the raw data for determining if an image is "high-quality," as discussed above in relation to Steps 406-412. For example, the image's raw data can be translated into a feature vector, and analysis of the features of the image represented by the vector can indicate a type of content of the image, as discussed above. For example, an image can be categorized as personal, news, sports, family, business, finance, other, medical, banking, important, and the like, or any other type of category classification.

In Step 506, a determination is made regarding whether the new image is "high-quality." Such "high-quality" analysis is performed in a similar manner as discussed above in relation to Step 410. That is, the raw image data of the image is compared against raw image data of high-quality images in the UGC collection in the same category. In some embodiments, the comparison can be across the entire UGC collection, which thereby alleviates Process 500 from performing Step 504.

According to some embodiments, as discussed above, Step 506 involves comparing the raw image data of the new image and the raw image data of the high-quality images in the UGC collection that are classified in the same category. If the new image has raw image data matching that of an identified high-quality image (at or above a comparison threshold), then the new image is classified as "high-quality" in a similar manner as discussed above in relation to Steps 406 and 410. According to some embodiments, the comparison can involve feature vectors associated with the images being compared, as the raw image data for each image can be translated to feature vectors by applying any known or to be known hash and/or probability algorithm, as discussed above. According to some embodiments, such comparison can instead be performed by any known or to be known machine learning algorithm, computational analysis, statistical analysis or technology, such as, but not limited to support vector machine training, vector analysis, cluster analysis, data mining, Bayesian network analysis, Hidden Markov models, artificial neural network analysis, logical model and/or tree analysis, and the like.

In Step 508, a similarity (or similarity score) is determined for the new image. That is, in some embodiments, the new image is scored as either a "0" or "1" as a result of the comparison in Step 506, as discussed above in relation to determining whether the image is "high-quality." As discussed above, the "0" denotes that the new image is not "high-quality" and the "1" denotes that the image is "high-quality." Such determination can be based on a number of features of the features vectors matching in accordance with a comparison threshold, as discussed above. That is, according to some embodiments, if the feature vector for the new image matches the feature vector for a high-quality image in the same category at or above the comparison threshold, then the new image is identified as "high-quality" and Process 500 proceeds to Step 514, as discussed below. If the feature vector for the new image matches the feature vector for a high-quality image in the same category below the match threshold, then the new image is not identified as "high-quality" and Process 500 proceeds to Step 510, as discussed below. In either instance, the new image is tagged, embedded, or otherwise identified with information (data or metadata) indicating the outcome of the quality determination of Step 508 (and such information is stored in a datastore associated with the UGC collection).

Step 510 involves monitoring the new image's heuristic data (when the image is identified as not "high-quality"). Such monitoring involves periodically analyzing the social data associated with the image to determine whether the image has developed an interest within a community or group of users. The monitoring occurring in Step 508 can be performed according to a predetermined time period or according to detection of activity by a user(s) with respect to the location of the new image. The analysis of the social data of the new image is performed in a similar manner as discussed above in relation to Step 402-406. Such monitoring enables the quality engine 300 to determine if an image's quality (e.g., interest among other users) changes over time. For example, if a user posts an image from his trip to the Lincoln Memorial in Washington, D.C. in April, this image may not be of interest to a variety of users (besides the user's family). However, in the following February this image may become interesting to other users (at or above the quality threshold) because of President's Day.

In some embodiments, when the heuristics/social data of the new image are determined to satisfy the quality threshold, the new image can be promoted. Step 512. Promotion or recommendation will be discussed in more detail below in relation to Step 514.

Step 514 involves promoting the new image due to its determination of being "high-quality." According to some embodiments, promotion (as in Steps 512 and 514) can involve sending or recommending the new image to a user or set of users determined to be interested in the new image, or alerting such user(s) to the new image. In some embodiments, promotion can also involve promoting the new image for marketing and/or licensing opportunities. In either situation, the users, marketers and/or licensors (referred to as users below for simplicity) would be required to be determined to be interested in the new image (e.g., interested in the new image's content).

As such, according to such embodiments, Steps 512/514 can involve determining a set of users (or a single user) to alert regarding the new image. According to embodiments of the present disclosure, Steps 512/514 involve determining which users on a network would find the new image to be of interest to them. Such determination is based on an analysis of the user data stored in database 320. As discussed above, user data can be associated with, identified and/or derived from any type of communication platform, communication platform, content provider and the like (such as, a user's Flickr® account). The user data can include, but is not limited to, information associated with a user's profile, user interests, user behavioral information, user attributes, user preferences, user demographic information, user location information, user biographic information, and the like, or some combination thereof. Such user data can reveal the user's online activity—i.e., what the user is reading, where the user is located, what the user is writing (or sharing online), how the user consumes information on a device, network or platform, and the like.

Thus, Steps 512/514 involve the application of any type of known or to be known algorithm, technique or technology related to statistical analysis, data mining, hash tree analysis, vector analysis, behavioral analysis and/or targeting analysis and the like. As such, Steps 512/514 involve analyzing the user data specific to a user to determine whether the user has expressed an interest in the new image.

According to some embodiments, such analysis includes, for example, determining if specific types of user data relating to the new image's category designation are present within the set of user data of the user. Such analysis can include, for example, formulating an n-dimensional vector to represent a user's interest (from the user data) and an n-dimensional vector to represent the new image (from the raw image data—or using the vector created above in Steps 504-508). Comparison of the vectors to one another resulting in an overlap of vector points (or coordinates) at or the above the quality threshold would reveal the user's interest in the new image (where, as discussed above, the quality threshold represents a minimum level of data identifiable from the analyzed user data that corresponds to the image data of the new image). Satisfaction of the quality threshold indicates that a user has, has expressed, and/or has indicated implicitly or explicitly through user input, user behavior, user settings, and the like, and/or some combination thereof, a likelihood that the user would be interested in the new image.

According to some embodiments, the promotion occurring in Steps 512/514 can involve alerting the interested users to the identity of the artist that created the new image. As such, the promotion occurring in Steps 512/514 results in identifying new, high-quality images in the UGC collection, in addition to identifying the artists (or creators) of such new, high-quality images. In some embodiments, the identification of new, high-quality images can be utilized when performing a search for content within the UGC collection (or within or across domains), as the new, high-quality content can be ranked higher or lower in the search result. Such ranking can be based on a system and/or user's preferences in discovering new content as opposed to consistently being shown the same content from a variety of search queries for the same content (or category of content).

Figure 6A:
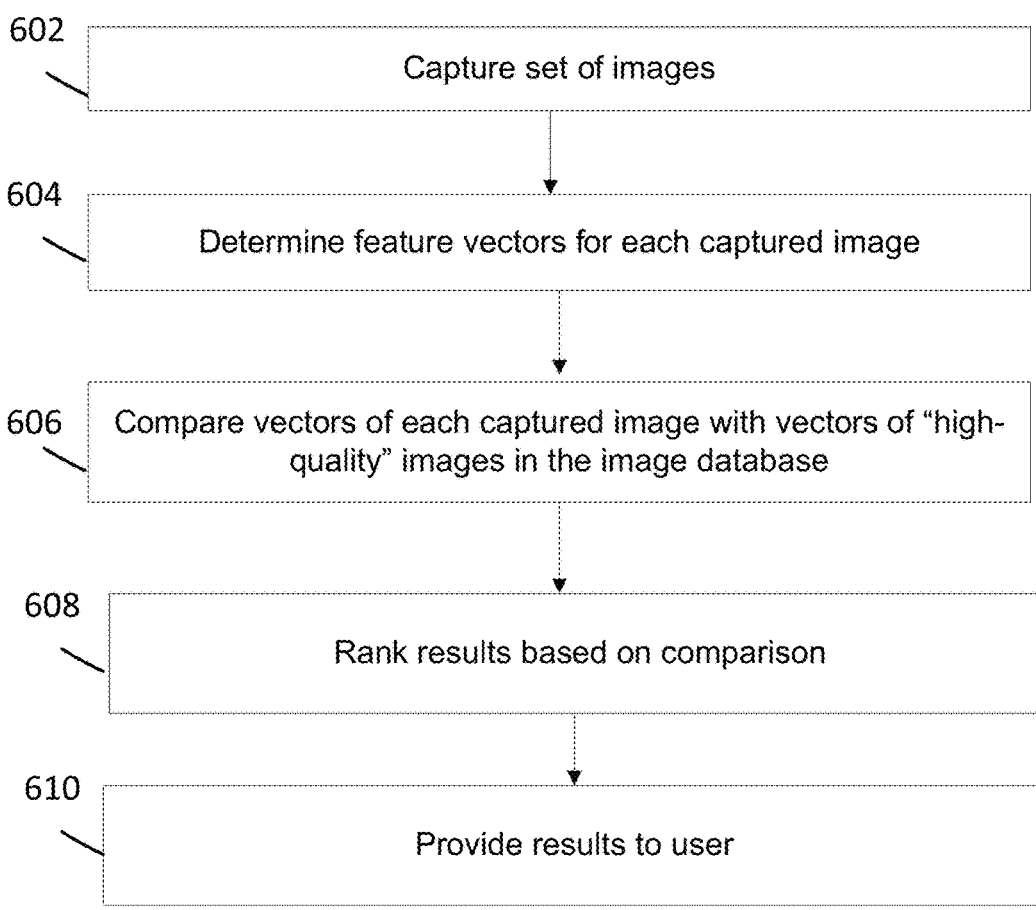

FIGS. 6A-6B are flowcharts illustrating steps performed in accordance with some embodiments of the present disclosure for applying the trained knowledge of the quality engine 300 for identifying high-quality images being captured or in-focus by a camera in real-time (or near real-time). FIG. 6A discusses Process 600 for identifying high-quality images that have already been captured by the camera-enabled device. FIG. 6B discusses Process 650 for identifying high-quality images that are in-focus in the lens of a camera prior to actually taking the picture (or capturing the picture), whereby a user can be alerted to when a high-quality image is in-focus or the camera can be instructed to automatically capture such image based on such high quality determination. Processes 600 and 650 are performed by camera module 308.

For purposes of this discussion, the identification of content will focus on capturing digital images; however, it should not be construed as limiting the scope of the instant application to solely images, as any known or to be known type of content or media (e.g., text, video, audio, multimedia, and the like) are applicable to the disclosed systems and methods discussed herein.

Turning to FIG. 6A, Process 600 begins with Step 602 where a set of images are captured. In some embodiments, the image capture occurring in Step 602 can involve a user taking a picture using a camera enabled digital device (e.g., mobile phone, wearable device or digital camera or the like). The number of images in the captured set of images can be in accordance with a predetermined number of captured images, which can be set by a user, in accordance with capabilities of the application being utilized to trigger the camera to capture the image(s), according to capabilities of the camera (or device) itself, or some combination thereof. In some embodiments, the captured set can be a number of recorded image frames (e.g., a video capture). In some embodiments, the set can be captured during a "burst" of image capture events when the camera is in "still camera mode" (e.g., continuous, high-speed digital image capture for capturing photographs).

The discussion of Process 600 will deal with the identification of a single image from a set of captured images. It should be understood, however, for purposes of this discussion, Process 600 can be performed for identifying multiple (or a subset) high-quality images satisfying the quality threshold from the captured set. Additionally, in some embodiments, Process 600 can be performed for a single captured image. That is, Process 600 can involve determining if the quality of a single captured image (e.g., Step 602) satisfies the quality threshold, whereby the captured image would be discarded if it is determined to not satisfy the quality threshold (i.e., not being "high-quality"). However, for purposes of this discussion, Process 600 will be discussed in relation to a set (or series) of captured images, which should be understood to not limit the scope of Process 600.

In Step 604, the captured set of images is analyzed to identify the raw image data associated with each image. The determination of the raw image data for each captured image can be performed in accordance with the Steps 408-410 of Process 400, and Step 502 of Process 500, inter alia, outlined above in relation to FIGS. 4A-5. That is, as discussed above, the captured images are analyzed in order to extract, determine or otherwise identify the raw image data (i.e., features/deep descriptors) of each captured image. According to some embodiments, these deep descriptors can be formulated into a feature vector for each image, whereby the hash function discussed above is applied so as to determine the m-bit codes for each image. According to other embodiments, these deep descriptors would feed into a classification layer, and a direct prediction can be made for the raw image data.

According to some embodiments, the determination of the captured images' m-bit codes can be performed on the capturing device or on a server or other device in communication with the capturing device. That is, in some embodiments, the image can be processed through a locally or remotely stored application that produces the encoding result. As such, in some embodiments, the quality engine 300 can be embodied as a mobile or desktop application or "app", downloadable from a mobile or remote online store. In some embodiments, the quality engine 300 can be a web-based application requiring no download of data, in that a user simply must access the site at which the application is located. In embodiments, quality engine 300 can be located on/at a server (or at a remote location on a network). Thus, in such embodiments, Step 604 involves the captured images (or captured image data and metadata) being communicated to the server/location for determination of the feature vectors/m-bit codes of each image, and after such computation, such information can be communicated back to the capturing device.

In Step 606, the formulated vectors of the captured images are compared against vectors of determined high-quality images. That is, as discussed above, Process 400's determined "high-quality" images in the UGC collection. These identified "high-quality" images were analyzed and feature vectors were formulated according to each image's raw data. Thus, as in Step 606, the formulated feature vectors of the captured images are compared against these "high-quality" feature vectors.

According to some embodiments, Step 606 can involve first identifying which content category the captured images are associated with. Such content category determination can be performed in similar manner as the category determination discussion related to Step 412 of Process 400, and Steps 504-508 of Process 500. That is, for example, the m-bit codes of each captured image are utilized as a search query to identify other m-bit codes of "high-quality" images in the UGC collection. A similarity at or above a similarity threshold between m-bit codes indicates that an image is associated with a particular category. Thus, as discussed herein, Step 606 can involve first identifying which content category the captured images correspond to, and then comparing the feature vectors of the captured images to the "high-quality" feature vectors associated with those images in the same category.

Step 606's comparison of feature vectors of images involves, according to some embodiments, performing a distance calculation between the points of each feature vector. That is, Step 606 involves performing a similarity analysis between the raw image data points of each captured images' feature vector with those data points of the "high-quality" images. Such similarity or distance (or calculation) can be computed according to any known or to be known distance calculation algorithm, including, but not limited to, Euclidean distance algorithm, Chebyshev distance algorithm, Hamming distance algorithm, Mahalanobis distance algorithm, and the like. The distance calculation is performed in accordance with a similarity threshold, which can be set by the system, administrator, user, content server, quality engine 300, or some combination thereof. Performance of the similarity determination in Step 606 can eliminate certain results that do not satisfy (at least equal to) a similarity threshold—i.e., those images that do not have at least a threshold amount of raw data similar to those previously determined to be "high-quality" images (of the same type/category). For example, if the comparison between a captured image's deep descriptors and a database image's descriptors falls below the threshold, then such image would be identified as not being "high-quality", and in some embodiments, may be identified accordingly, deleted, or even automatically deleted upon such determination.

In some embodiments, the analyzed (i.e., compared) captured images can be ranked, so that the user can be alerted to the quality of each captured image. Step 608. Such ranking is beneficial to the user so that the user can identify which images are "high-quality" and which images are not. Such identification may be necessary as the user may want to select a captured high-quality image, but not the most high-quality image based on bandwidth, storage or other resource conservation considerations of the user's device, user account, or network availability/capability, and the like. According to some embodiments, the ranking is based on the above similarity determination, whereby the results with the higher similarity value to the "high-quality" images will be ranked higher than those with a lower value. Indeed, some images having a similarity value below a threshold may be removed from the image capture results or provided on a subsequent page/screen.

In Step 610, the results of the comparison in Step 606, and in some embodiments, the ranking in Step 608 are provided to the user. In some embodiments, the captured images determined to be high-quality (e.g., the ranked set of high-quality images) can be presented to a user on the capturing device, in an associated application, or in a web-based document page, and the like. In some embodiments, the captured images determined to be "high-quality," or the most "high-quality" captured image can be automatically uploaded to the UGC collection (e.g., the user's Flickr® page). In such embodiments, the uploaded image(s) may then be subject to Process 500's analysis. In some embodiments, the user can be presented with the ranked set of images, which may or may not include those images determined not to currently be "high-quality", whereby the user can then identify which images to save, store, share, upload and/or download, and the like.

Turning to FIG. 6B, Process 650 begins with Step 652 where the image data currently being viewed by a camera lens (i.e., optically sensed, viewed or present within the camera lens) is identified. Step 652 involves analyzing such image data in order to determine the raw image data associated with the image "in focus" in the camera lens (or being read by the camera sensor). The analysis, parsing, extraction, or otherwise identification of such raw image data is performed in a similar manner as discussed above in relation to Steps 408-410 of Process 400, Step 502 of Process 500, and Step 604 of Process 600, inter alia, as outlined above in relation to FIGS. 4A-6A.

According to some embodiments, as understood by those of skill in the art, the optical control system of a camera controls the lens for auto-focusing the camera lens or enabling manual focusing by a user. Focusing of the camera lens, specifically auto-focusing, can be performed by any type of known or to be known active, passive or hybrid variant, or trap focus (and the like) functionality implemented by the camera device.

As understood by those of skill in the art, an image that is "in focus" in the camera lens, as in Step 652, refers to image data generated from a collection of pixels collectively associated with light rays originating from a geographic point. The light rays are passed through the camera's lens and converge on a sensor(s) (e.g., sensor 266 of the device 200), whereby the sensor, through a digital image processor (and/or processing application) can produce image data that can be stored in the camera device's flash or temporary memory. Such image data is produced without actually taking the picture, as such image data can be viewed through a camera's lens, or through a viewfinder or view screen associated with a camera.

According to some embodiments, the image data does not need to be "focused" as understood by those of skill in the art (e.g., not blurred); however, for purposes of this discussion, with the advent of almost all commercially available camera devices utilizing some type of auto-focus technology, the instant disclosure highlights "focused" images within a camera lens or sensor; however, it should not be construed as limiting, as a "blurred" images or a camera device implementing known or to be known filtering, auto-focus and/or image capturing technology are applicable to the disclosed systems and methods discussed herein.

As a result of the identification of the raw image data of the "in-focus" image, as in Step 652, Steps 654-660 of Process 650 are performed in a similar manner as Steps 602-610 of Process 600 as discussed above. That is, the raw image data from Step 652 is utilized to formulate a feature vector and m-bit code for the image. Step 654. Then, the feature vector is compared to other high-quality images to determine the image's quality. Step 656. In some embodiments, the comparison may be locally performed based on other determined "high-quality" images stored on the capturing device. In some embodiments, the comparison is performed respective to the images in a UGC collection, as discussed above. According to some embodiments, the comparison of the image data occurring in Step 656 may also include and be based on a category determination of the image data, as discussed above.

In Step 658, a determination is made regarding the quality of the image data that is "in focus". That is, a determination is made as to whether the "in focus" image is "high-quality" or not. Such determination is based on the comparison of feature vectors, and performed in a similar manner as discussed above in relation Steps 506-508 of Process 500. If the image data corresponds to a "high-quality" image, as a result of the Step 658 determination, then, in some embodiments, the device can automatically capture the image. Step 660. That is, if the "in focus" image is determined to be "high-quality," then the device can be instructed to automatically capture the image. In some embodiments, the automatic capture of the image may result in the image being automatically uploaded to the UGC collection, whereby the analysis of Process 500 can then be performed on the image.

In some embodiments, the determination of "high quality" imagery can also be utilized to optimize parameters of an image filter, as commonly used on Flickr®, Instagram™ and the like, where optimized filters can be implemented per site, or per user. Such "high quality" imagery determinations can be based on the determinations occurring in Processes 400-650, as discussed above. As discussed above, such optimization can be effectuated on the client-side application, or on the server-side upon uploading the picture to the website associated with the application being used to capture the photograph. For example, the camera can be configured to automatically apply filters so that only "high-quality" images are captured. That is, the camera can automatically apply a filter to the "in focus" image (prior to capture) so that the image is modified to a "high quality" level, where such level can be set by the camera device, quality engine 300, user or some combination thereof. In some embodiments, the filtering of an image can automatically occur immediately after, or upon capturing the image.

In some embodiments, a "high-quality" image determination, as in Step 658 may result in an alert being provided to the user. Such alert can be a sound, vibration, visual alert, or some combination thereof, triggered on the capturing device to alert the user that a "high-quality" image is "in focus". The user can then determine whether to actually capture the image or refocus or redirect the camera.

In some embodiments, if the "in focus" image is determined to not be "high-quality", then the image may still be captured, and displayed to the user so that the user can make the final decision. In such instances, information can be provided to the user upon such display indicating the quality determination of such image. In some embodiments, a determined "in focus" non-high-quality image may be automatically discarded, where capturing device can be instructed by the quality engine 300 to delete the image data captured in Step 652. In some embodiments, such deletion may be resultant a user instruction after prompting the user with such deletion decision, as above, or may be automatic based on the quality determination.

According to some embodiments of the present disclosure, the discovery, determination and identification of new and/or high-quality images discussed above in relation to Processes 500, 600 and 650 can involve iterative or recursive bootstrapping or aggregation functionality, whereby the results of such Processes can be fed back to the quality engine 300 training (as in Process 400) to improve the accuracy of the analyzed and implemented information. Indeed, embodiments of the present disclosure involve the quality engine 300 applying such recursive/bootstrapping functions utilizing any known or to be known open source and/or commercial software machine learning algorithm, technique or technology.

FIG. 7 is a work flow example 700 for serving relevant advertisements based on the image (or content) being captured and/or promoted to a user, as per the result of FIGS. 5-6B discussed above. For example, in some embodiments, FIG. 7 illustrates how advertisements are served to a user based on at least one of: the category (or label) or content of a captured image, and/or the category of content of the promotion or recommendation. Indeed, according to some embodiments, the content that forms the basis of the advertisement(s) can be based on a label of an image, a category/label of an image, the features and descriptors associated with a stored image or captured image, or other contextual data surrounding the image or its capture (e.g. the location where and/or time when the picture was taken, and/or the user taking and/or uploading such picture).

By way of a non-limiting example, work flow 700 enables a user requesting an image(s) of the Empire State Building (e.g., a search for such images as discussed above in relation to FIG. 5) on his mobile phone, whereby an advertisement associated with tickets for Empire State Building's observation deck can be displayed in association with the image search results comprising at least one new high quality image. In another non-limiting embodiments, if a user is determined to be taking pictures with his/her mobile phone of the Grand Canyon, upon identification of the best image (from the "burst"/series of images or image data being in focus, as per the discussion in FIGS. 6A-6B), an advertisement related to admission to the Grand Canyon, or hiking excursions or hotel deals can be provided to the user. Such ads may be provided to the user as a push message that is to appear within the application the user is using to access the camera on the device, or may be provided as part of the display when the user loads the image to his/her image library (e.g., on the user's Flickr® page).

In Step 702, an image is identified. This image can be based on the identification process outlined above with respect to FIGS. 5-6B. In some embodiments, the identity of the image can be based on a runtime request, such as, but not limited to, a search for an image, or sharing an image, and the like. For purposes of this disclosure, Process 700 will refer to a single image being utilized as the basis for serving an advertisement(s); however, it should not be construed as limiting, as any number of images can form such basis, as well as any type of media, multi-media or hypermedia can for such basis without departing from the scope of the instant disclosure.

In Step 704, the image is analyzed to identify the raw data associated with the image. Such analysis is performed in a similar manner as discussed above in relation to Step 408 of FIG. 4A, inter alia. For example, such analysis can involve parsing the image identified in Step 702 and extracting the raw image data. In some embodiments, such analysis involves applying a deep learning algorithm (or any other known or to be known data extraction algorithm) to the identified image to determine the raw image data of the image (i.e., the features and descriptors), as discussed above.

In Step 706, a context is determined based on the extracted raw image data. As discussed above, in relation to Step 412 and 504, the raw image data can provide an indication as to the type of content associated with the image. For example, a context is determined based on the content of an image captured and/or promoted, content of an image provided in a runtime request (e.g., search result, shared post, message, and the like), and/or descriptors, features or labels of the images or other metadata in the database and/or associated with a captured image. This context forms a basis for serving advertisements having a similar context (i.e., relating to the type of content). In some embodiments, the context can be determined in a similar manner as discussed above in relation to determining a category of content (as in Step 412, inter alia). Thus, Step 706 can involve determining a content type associated with the provided image(s), a content category associated with the image(s), and the like.

In some embodiments, the identification of the context from Step 706 may occur during analysis of the image(s) (as discussed above in relation to FIGS. 5-6B), after analysis of the image(s), and/or after or before communication (e.g., recommendation or display) of the image(s) to the user, or some combination thereof. In Step 708, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

As discussed above, Step 706 can, in addition to determining a context from an image(s), involve the context being further and/or alternatively based upon content associated with, derived or extracted from an image(s) and/or other types of content items/objects or types. For purposes of work flow 700 reference will be made to an image(s) for simplicity; however, it should not be viewed as limiting the scope of the instant disclosure and applicability of work flow 700 to the embodiments discussed herein.

In Step 708, the advertisement server 130 searches the ad database for advertisements that match the identified context. In Step 710, an advertisement is selected (or retrieved) based on the results of Step 708. In some embodiments, the advertisement can be selected based upon the result of Step 708, and modified to conform to attributes of the page, message or method upon which the advertisement will be displayed, and/or to the application and/or device for which it will be displayed. In some embodiments, as in Step 712, the selected advertisement is shared or communicated via the application the user is utilizing to request, capture and/or access the image(s). In some embodiments, the selected advertisement is sent directly to each user's computing device. In some embodiments, the selected advertisement is displayed in conjunction with the requested, captured and/or accessed image(s) on the user's device and/or within the application being used to request, capture and/or access the image(s).

As shown in FIG. 8, internal architecture 800 of a computing device(s), computing system, computing platform and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    capturing, via a camera of a computing device, a set of images during a time period associated with a capture event, said time period beginning at an onset of capturing a first image in said set of images and ending when a last image of said set of images is captured, said captured images comprising raw image data generated from said capturing;
    parsing, via the computing device during the time period said capturing is performed, each image of the set of images as they are captured during the time period, and based on said parsing, extracting, via the computing device, the raw image data, said raw image data of each image comprising features associated with content of each captured image;
    comparing, via the computing device during the time period said capturing is performed, the raw image data of each image with raw image data of a second image, said comparison comprising identifying a similarity between the raw image data of the images and the raw image data of the second image;
    determining, via the computing device during the time period said capturing is performed, a quality of each image based on said comparison, said quality based on the identified similarity and comprising a value indicating said identified similarity;
    at the end of the time period said capturing is performed, identifying, via the computing device, an image from the set of images having a highest quality based on said determined quality value of each image;
    automatically discarding, via the computing device, at the end of the time period upon identifying the image, without user input, other images in the set of images that are not the identified image; and
    communicating, via the computing device, the identified image to a user of the computing device.

2. The method of claim 1, further comprising:
    determining the identified image to be a high quality image, said high quality determination based on the similarity of the raw image data of the identified image satisfying a comparison threshold.

3. The method of claim 1, further comprising:
    ranking each image in the set of images based on the identified similarity, wherein said ranking comprises said identified image being atop the ranking and lower ranked images having a decreasing similarity value.

4. The method of claim 1, wherein said comparison further comprises:

translating the features of each image in the image set into a feature vector for each image, wherein each feature vector has a dimensional value proportional to a number of features;

extracting features of the second image based on the second raw image data;

translating the features of the second image into a feature vector having a dimensional value proportional to a number of features of the second image; and determining said similarity based on a semantic similarity between each data point of each feature vector of each image in the image set and each data point of the second feature vector.

5. The method of claim 1, further comprising:

determining a content category of the image set based on the raw image data of the image set, wherein said second image corresponds to the determined content category.

6. The method of claim 1, wherein said second image is a high-quality image, wherein a level of interest on a network is at or above a quality threshold associated with a requisite level of user interest.

7. The method of claim 1, further comprising:

determining a context of the identified image based on the raw image data;

causing communication, over the network, of said context to an advertisement platform to obtain a digital content object comprising digital advertisement content associated with said context; and communicating said identified digital content object in association with said communication of said identified image.

8. A non-transitory computer-readable storage medium tangibly encoded with computer-executable instructions, that when executed by a processor associated with a computing device, performs a method comprising:

capturing, via a camera of the computing device, a set of images during a time period associated with a capture event, said time period beginning at an onset of capturing a first image in said set of images and ending when a last image of said set of images is captured, said captured images comprising raw image data generated from said capturing;

parsing, via the computing device during the time period said capturing is performed, each image of the set of images as they are captured during the time period, and based on said parsing, extracting, via the computing device, the raw image data, said raw image data of each image comprising features associated with content of each captured image;

comparing, via the computing device during the time period said capturing is performed, the raw image data of each image with raw image data of a second image, said comparison comprising identifying a similarity between the raw image data of the images and the raw image data of the second image;

determining, via the computing device during the time period said capturing is performed, a quality of each image based on said comparison, said quality based on the identified similarity and comprising a value indicating said identified similarity;

at the end of the time period said capturing is performed, identifying, via the computing device, an image from the set of images having a highest quality based on said determined quality value of each image;

automatically discarding, via the computing device, at the end of the time period upon identifying the image, without user input, other images in the set of images that are not the identified image; and communicating, via the computing device, the identified image to a user of the computing device.

9. The non-transitory computer-readable storage medium of claim 8, further comprising:

determining the identified image to be a high quality image, said high quality determination based on the similarity of the raw image data of the identified image satisfying a comparison threshold.

10. The non-transitory computer-readable storage medium of claim 8, further comprising:

ranking each image in the set of images based on the identified similarity, wherein said ranking comprises said identified image being atop the ranking and lower ranked images having a decreasing similarity value.

11. The non-transitory computer-readable storage medium of claim 8, wherein said comparison further comprises:

translating the features of each image in the image set into a feature vector for each image, wherein each feature vector has a dimensional value proportional to a number of features;

extracting features of the second image based on the second raw image data;

translating the features of the second image into a feature vector having a dimensional value proportional to a number of features of the second image; and determining said similarity based on a semantic similarity between each data point of each feature vector of each image in the image set and each data point of the second feature vector.

12. The non-transitory computer-readable storage medium of claim 8, further comprising:

determining a content category of the image set based on the raw image data of the image set, wherein said second image corresponds to the determined content category.

13. The non-transitory computer-readable storage medium of claim 8, wherein said second image is a high-quality image, wherein a level of interest on a network is at or above a quality threshold associated with a requisite level of user interest.

14. A computing device comprising:

a camera;

a processor; and a non-transitory computer-readable storage medium for tangibly storing thereon program logic for execution by the processor, the program logic comprising:

logic executed by the processor for capturing, via the camera of the computing device, a set of images during a time period associated with a capture event, said time period beginning at an onset of capturing a first image in said set of images and ending when a last image of said set of images is captured, said captured images comprising raw image data generated from said capturing;

logic executed by the processor for parsing, via the computing device during the time period said capturing is performed, each image of the set of images as they are captured during the time period, and based on said parsing, extracting, via the computing device, the raw image data, said raw image data of each image comprising features associated with content of each captured image;

logic executed by the processor for comparing, via the computing device during the time period said capturing is performed, the raw image data of each image with raw image data of a second image, said comparison comprising identifying a similarity between the raw image data of the images and the raw image data of the second image;

logic executed by the processor for determining, via the computing device during the time period said capturing is performed, a quality of each image based on said comparison, said quality based on the identified similarity and comprising a value indicating said identified similarity;

logic executed by the processor for identifying, at the end of the time period said capturing is performed, via the computing device, an image from the set of images having a highest quality based on said determined quality value of each image;

logic executed by the process for automatically discarding, via the computing device, at the end of the time period upon identifying the image, without user input, other images in the set of images that are not the identified image; and logic executed by the processor for communicating, via the computing device, the identified image to a user of the computing device.

15. The computing device of claim 14, further comprising:

logic executed by the processor for determining the identified image to be a high quality image, said high quality determination based on the similarity of the raw image data of the identified image satisfying a comparison threshold.

16. The computing device of claim 14, further comprising:

logic executed by the processor for ranking each image in the set of images based on the identified similarity, wherein said ranking comprises said identified image being atop the ranking and lower ranked images having a decreasing similarity value.

17. The computing device of claim 14, wherein said comparison further comprises:

logic executed by the processor for translating the features of each image in the image set into a feature vector for each image, wherein each feature vector has a dimensional value proportional to a number of features;

logic executed by the processor for extracting features of the second image based on the second raw image data;

logic executed by the processor for translating the features of the second image into a feature vector having a dimensional value proportional to a number of features of the second image; and logic executed by the processor for determining said similarity based on a semantic similarity between each data point of each feature vector of each image in the image set and each data point of the second feature vector.

18. The computing device of claim 14, further comprising:

logic executed by the processor for determining a content category of the image set based on the raw image data of the image set, wherein said second image corresponds to the determined content category.

19. The computing device of claim 14, wherein said second image is a high-quality image, wherein a level of interest on a network is at or above a quality threshold associated with a requisite level of user interest.

* * * * *